(12) United States Patent
Saito

(10) Patent No.: US 10,511,248 B2
(45) Date of Patent: Dec. 17, 2019

(54) STEPPING MOTOR, MOTOR DRIVE DEVICE AND TIME DISPLAY DEVICE

(71) Applicant: CASIO COMPUTER CO., LTD., Shibuya-ku, Tokyo (JP)

(72) Inventor: Yuta Saito, Kokubunji (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/391,704

(22) Filed: Dec. 27, 2016

(65) Prior Publication Data

US 2017/0279395 A1   Sep. 28, 2017

(30) Foreign Application Priority Data

Mar. 25, 2016   (JP) .................. 2016-061165

(51) Int. Cl.
| | | |
|---|---|---|
| *H02P 25/066* | (2016.01) | |
| *G04C 3/14* | (2006.01) | |
| *H02K 37/14* | (2006.01) | |
| *H02K 1/02* | (2006.01) | |
| *H02K 1/14* | (2006.01) | |
| *H02K 1/27* | (2006.01) | |
| *H02K 37/12* | (2006.01) | |
| *H02P 8/02* | (2006.01) | |

(52) U.S. Cl.
CPC ............ *H02P 25/066* (2016.02); *G04C 3/14* (2013.01); *H02K 1/02* (2013.01); *H02K 1/14* (2013.01); *H02K 1/27* (2013.01); *H02K 37/12* (2013.01); *H02K 37/14* (2013.01); *H02P 8/02* (2013.01)

(58) Field of Classification Search
CPC .......... H02P 25/006; G04C 3/14; H02K 1/02; H02K 1/14; H02K 1/27; H02K 37/12
USPC ........................................... 318/696
See application file for complete search history.

(56) References Cited

U.S. PATENT DOCUMENTS

| | | | |
|---|---|---|---|
| 4,312,059 A | 1/1982 | Mandai et al. | |
| 4,542,329 A * | 9/1985 | Tu Xuan ............... | G04C 3/143 310/49.24 |
| 6,172,438 B1 * | 1/2001 | Sakamoto ............. | H02K 37/12 310/156.12 |
| 6,194,862 B1 | 2/2001 | Hara | |

(Continued)

FOREIGN PATENT DOCUMENTS

| | | |
|---|---|---|
| DE | 19925451 A1 | 1/2000 |
| JP | 08047726 A | 2/1996 |

(Continued)

OTHER PUBLICATIONS

Extended European Search Report (EESR) dated Aug. 7, 2017 issued in counterpart European Application No. 17162406.7.

(Continued)

*Primary Examiner* — Bickey Dhakal
*Assistant Examiner* — Devon A Joseph
(74) *Attorney, Agent, or Firm* — Holtz, Holtz & Volek PC

(57) ABSTRACT

A stepping motor includes a rotor, a stator and three coils. The rotor is two-pole magnetized in a radius direction. The stator is provided with a rotor receiving section for receiving the rotor. The three coils are magnetically connected with the stator. At least one of the three coils is an integrated coil which is integrally formed with the stator by winding a coil around a part of the stator.

19 Claims, 12 Drawing Sheets

(56) References Cited

U.S. PATENT DOCUMENTS

| | | | |
|---|---|---|---|
| 6,246,205 B1* | 6/2001 | Kujira | H02P 8/02 |
| | | | 318/400.39 |
| 7,050,311 B2* | 5/2006 | Lai | H02M 5/225 |
| | | | 363/37 |
| 7,511,391 B2* | 3/2009 | Kawamoto | H02K 1/14 |
| | | | 310/40 MM |
| 9,537,435 B2 | 1/2017 | Saito et al. | |
| 2005/0099082 A1 | 5/2005 | Nashiki | |
| 2006/0202580 A1* | 9/2006 | Lee et al. | H02K 1/2773 |
| | | | 310/156.45 |
| 2006/0226716 A1* | 10/2006 | Kawamoto | H02K 1/14 |
| | | | 310/49.22 |
| 2007/0236099 A1 | 10/2007 | Kim et al. | |
| 2012/0256510 A1* | 10/2012 | Yamada | H02K 19/12 |
| | | | 310/184 |
| 2014/0028160 A1* | 1/2014 | Yamada | H02K 19/12 |
| | | | 310/68 B |
| 2015/0084573 A1 | 3/2015 | Saito et al. | |
| 2015/0085625 A1 | 3/2015 | Saito et al. | |
| 2017/0277130 A1* | 9/2017 | Saito | G04C 3/143 |
| 2017/0288476 A1 | 10/2017 | Fischer et al. | |

FOREIGN PATENT DOCUMENTS

| | | |
|---|---|---|
| JP | 09028095 A | 1/1997 |
| JP | 2881160 B2 | 4/1999 |
| JP | 2014195371 A | 10/2014 |
| JP | 2015061467 A | 3/2015 |
| JP | 2015084633 A | 4/2015 |

OTHER PUBLICATIONS

Extended European Search Report (EESR) dated Feb. 2, 2018 issued in counterpart European Application No. 17162406.7.
Japanese Office Action (and English language translation thereof) dated Jul. 3, 2018 issued in counterpart Japanese Application No. 2016-061165.
Office Action (Final Rejection) dated Jan. 10, 2019 issued in U.S. Appl. No. 15/881,284.
Office Action (Non-Final Rejection) dated Sep. 24, 2019 issued in U.S. Appl. No. 15/881,284.

* cited by examiner

FIG.2A
FIG.2B
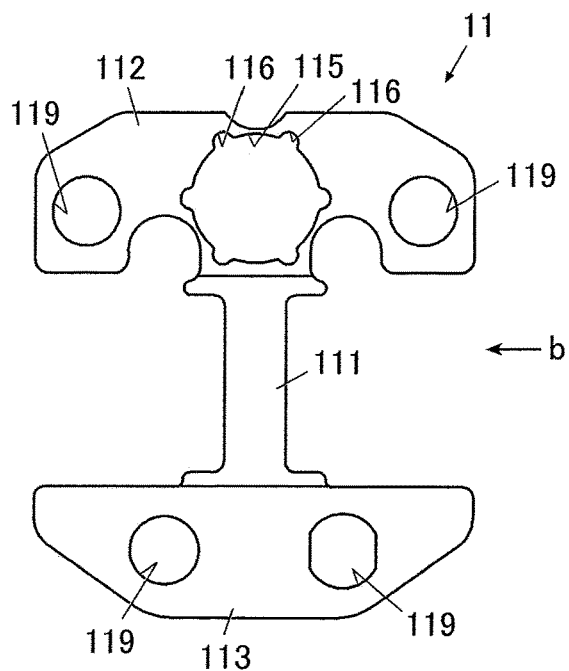
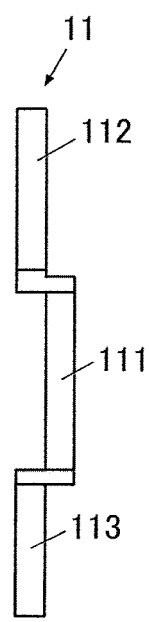
FIG.2C
FIG.2D
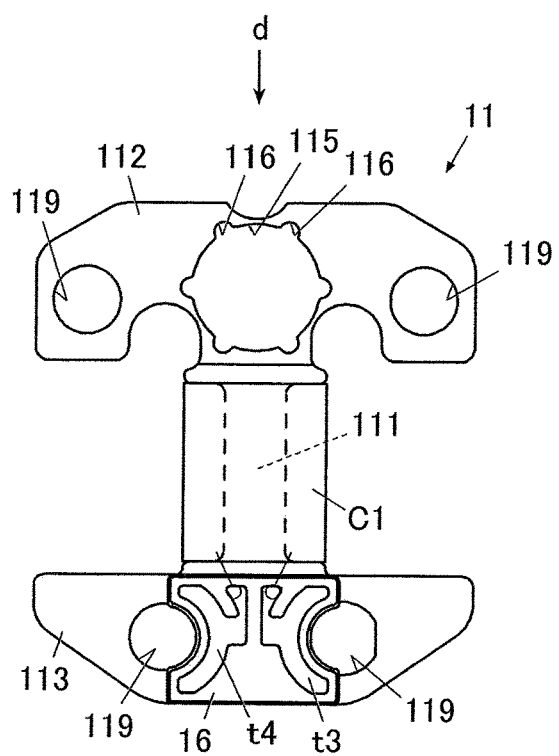
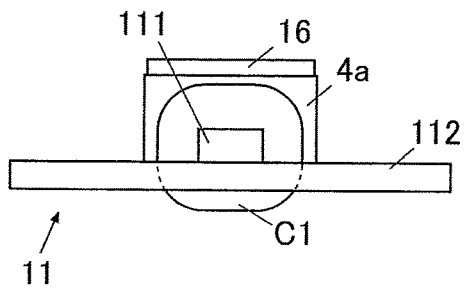

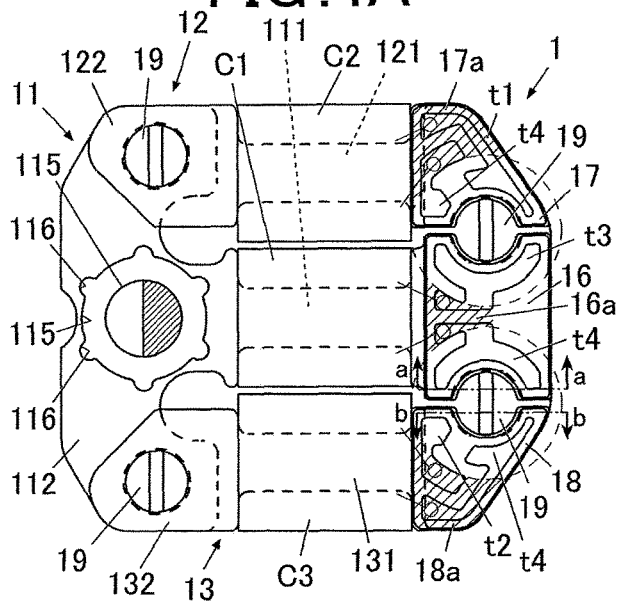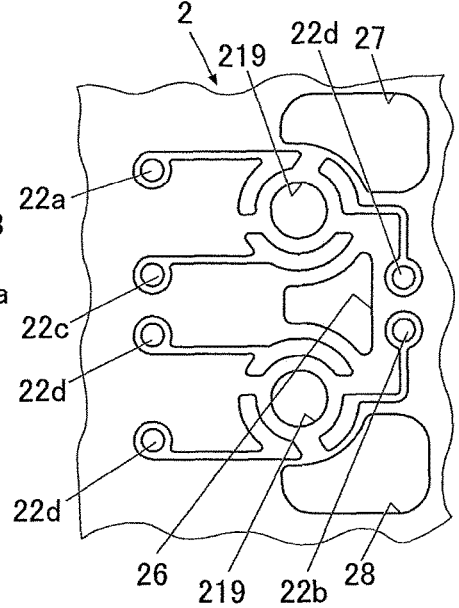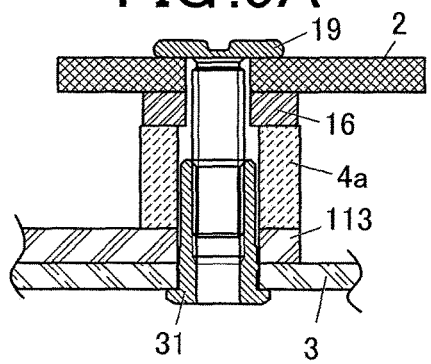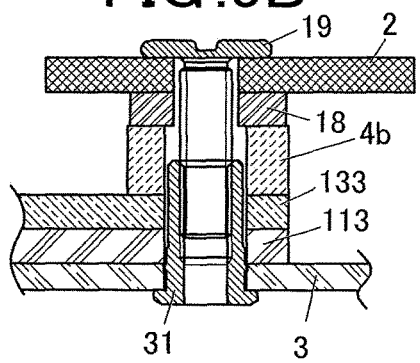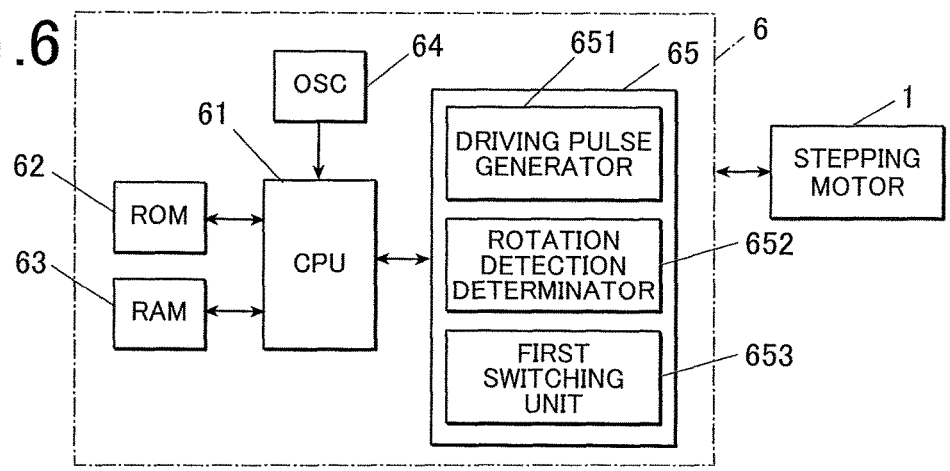

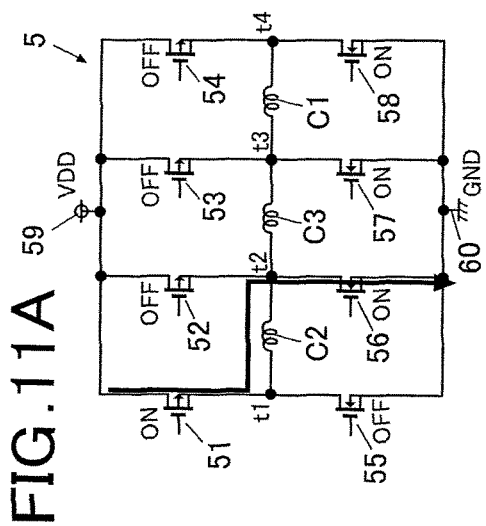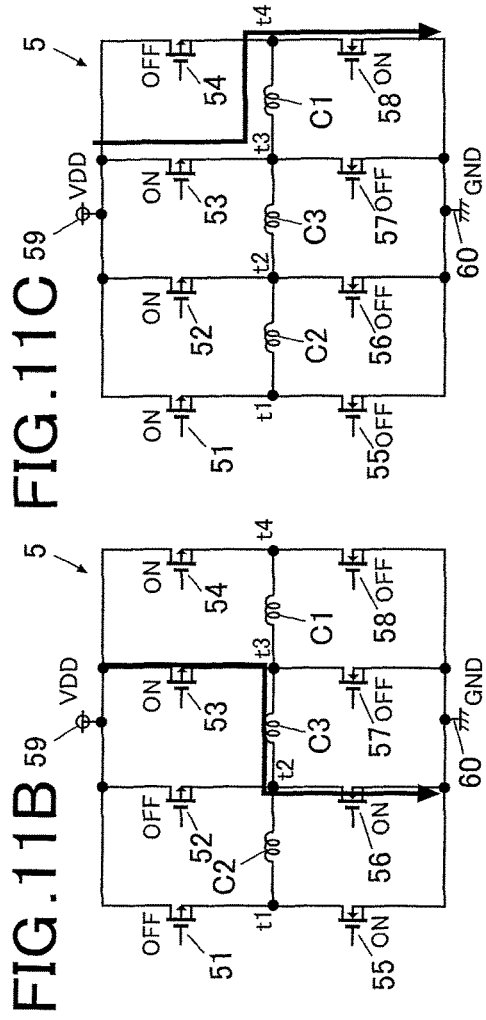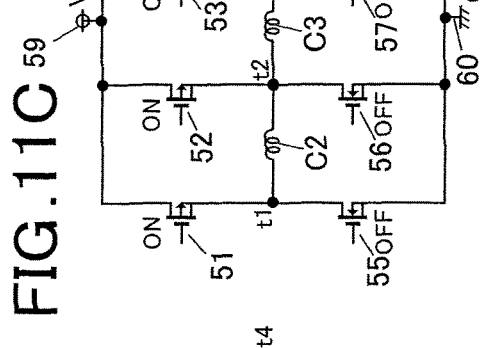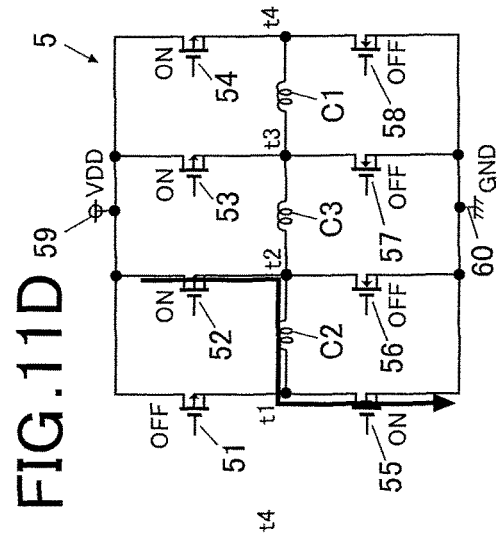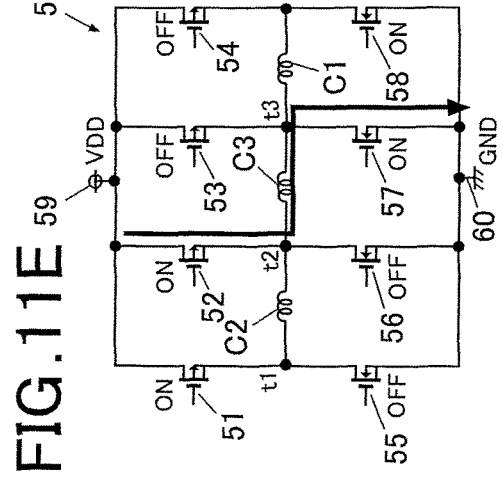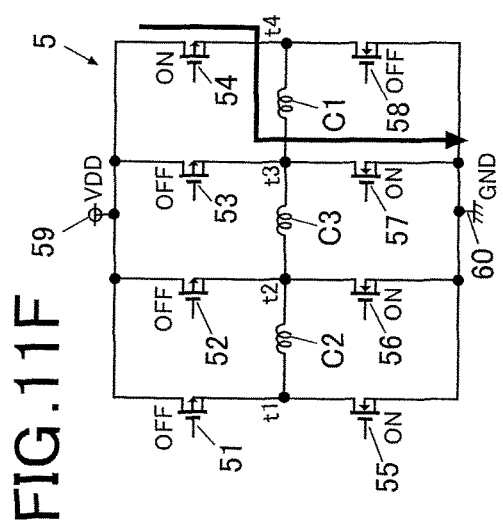

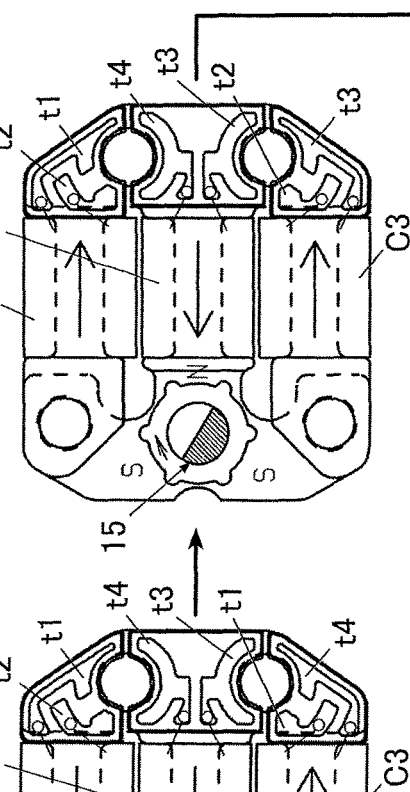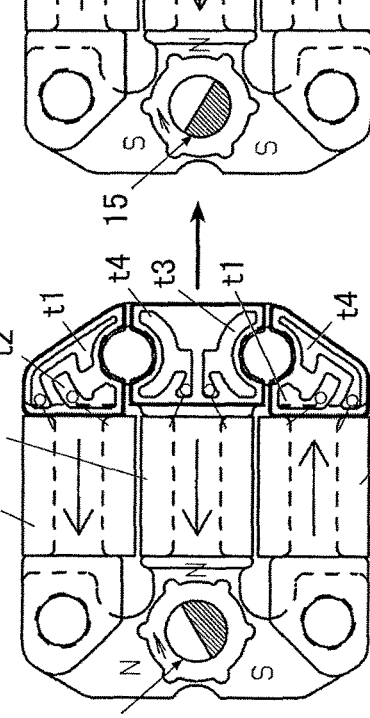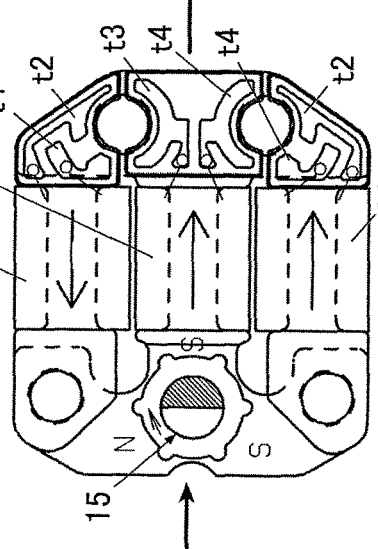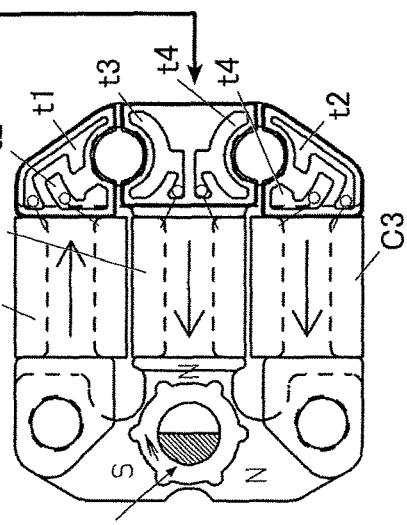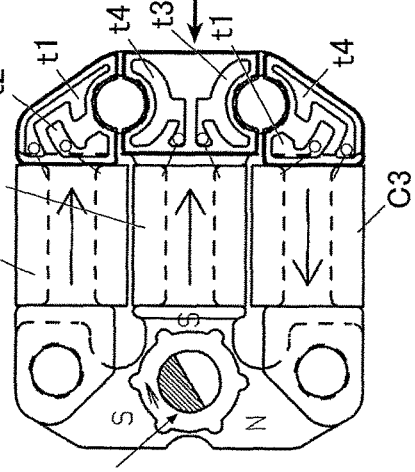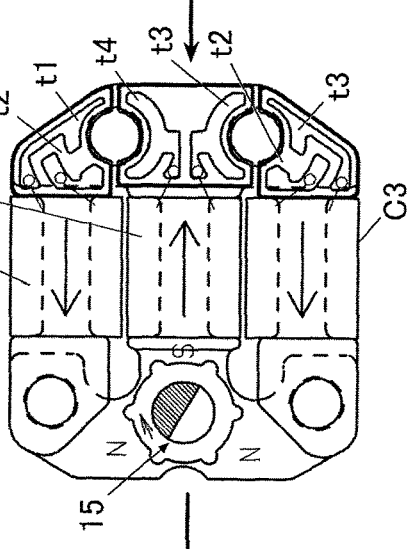

STEPPING MOTOR, MOTOR DRIVE DEVICE AND TIME DISPLAY DEVICE

BACKGROUND OF THE INVENTION

1. Field of the Invention

The present invention relates to a stepping motor, a motor drive device and a time display device.

2. Description of Related Art

Traditionally, there is known a stepping motor which is provided with two coils and which can rotate forward and backward by applying driving pulses to the two coils as needed.

For example, JP 2014-195371 discloses a stepping motor in which driving pulses are applied simultaneously or sequentially to two coils so as to rotate a two-pole magnetized rotor in steps of predetermined degrees.

However, with respect to the stepping motors such as the one disclosed in JP 2014-195371, there exists a period where only one of the two coils is applied current and a period where both coils are applied current when the stepping motor is made to rotate.

Therefore, there has been a problem that the amount of power consumption during the latter period become large and there is a need for further power saving.

SUMMARY OF THE INVENTION

The present invention was made in view of the above problem, and an object is to provide a stepping motor provided with a plurality of coils and which can save the energy needed for rotating a rotor as much as possible in a case where the rotor is made to rotate in steps of predetermined angles by applying driving pulses to the coils, a motor drive device thereof and a time display device.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2A is a plan view of a stator;

FIG. 2B is a side view of the stator when seen from the direction indicated by the arrow b in FIG. 2A;

FIG. 2C is a plan view of the stator where a coil and a coil substrate are mounted thereon;

FIG. 2D is the front vie of the stator when seen in the direction indicated by the arrow d in FIG. 2C;

FIG. 4A is a plan view of a stepping motor which is in the implemented state;

FIG. 4B is a plan view showing a main substrate;

FIG. 5A is a cross-sectional view when cut along the line a-a shown in FIG. 4A;

FIG. 5B is a cross-sectional view when cut along the line b-b shown in FIG. 4A;

FIG. 6 is a block diagram of main components showing the controlling structure according to the first embodiment;

FIG. 11A shows a circuit of a current which flows through the motor drive circuit according to a modification of the first embodiment and this circuit corresponds to FIG. 8A;

FIG. 11B shows a circuit of a current which flows through the motor drive circuit according to the modification of the first embodiment and this circuit corresponds to FIG. 8B;

FIG. 11C shows a circuit of a current which flows through the motor drive circuit according to the modification of the first embodiment and this circuit corresponds to FIG. 8C;

FIG. 11D shows a circuit of a current which flows through the motor drive circuit according to the modification of the first embodiment and this circuit corresponds to FIG. 8D;

FIG. 11E shows a circuit of a current which flows through the motor drive circuit according to the modification of the first embodiment and this circuit corresponds to FIG. 8E;

FIG. 11F shows a circuit of a current which flows through the motor drive circuit according to the modification of the first embodiment and this circuit corresponds to FIG. 8F;

FIG. 12A shows a magnetic flux which flows through a coil in the stepping motor according to the second embodiment and shows the initial state where the first driving pulse is applied;

FIG. 12B shows a magnetic flux which flows through a coil in the stepping motor according to the second embodiment and shows a state where the second driving pulse is applied;

FIG. 12C shows a magnetic flux which flows through a coil in the stepping motor according to the second embodiment and shows a state where the third driving pulse is applied;

FIG. 12D shows a magnetic flux which flows through a coil in the stepping motor according to the second embodiment and shows a state where the fourth driving pulse is applied;

FIG. 12E shows a magnetic flux which flows through a coil in the stepping motor according to the second embodiment and shows a state where the fifth driving pulse is applied;

FIG. 12F shows a magnetic flux which flows through a coil in the stepping motor according to the second embodiment and shows a state where the sixth driving pulse is applied;

FIG. 13A shows a circuit of a current which flows through the motor drive circuit according to the second embodiment and this circuit corresponds to FIG. 12A;

FIG. 13B shows a circuit of a current which flows through the motor drive circuit according to the second embodiment and this circuit corresponds to FIG. 12B;

FIG. 13C shows a circuit of a current which flows through the motor drive circuit according to the second embodiment and this circuit corresponds to FIG. 12C;

FIG. 13D shows a circuit of a current which flows through the motor drive circuit according to the second embodiment and this circuit corresponds to FIG. 12D;

FIG. 13E shows a circuit of a current which flows through the motor drive circuit according to the second embodiment and this circuit corresponds to FIG. 12E;

FIG. 13F shows a circuit of a current which flows through the motor drive circuit according to the second embodiment and this circuit corresponds to FIG. 12F.

DESCRIPTION OF THE PREFERRED EMBODIMENT

First Embodiment

Hereinafter, with reference to FIGS. 1A to 9F, the first embodiment of the stepping motor and the motor drive device according to the present invention will be described. The stepping motor and the motor drive device according to the embodiment are a small size motor and a drive device for driving the small size motor which are applied to drive the hand moving mechanism which move the hands, the date mechanism and the like of a time display device such as a watch or the like (in the embodiment a time piece 500 is shown as an example, see FIG. 7), for example. However, the embodiment to which the stepping motor and the motor drive device according to the present invention can be applied is not limited to such example.

Figure 1A:
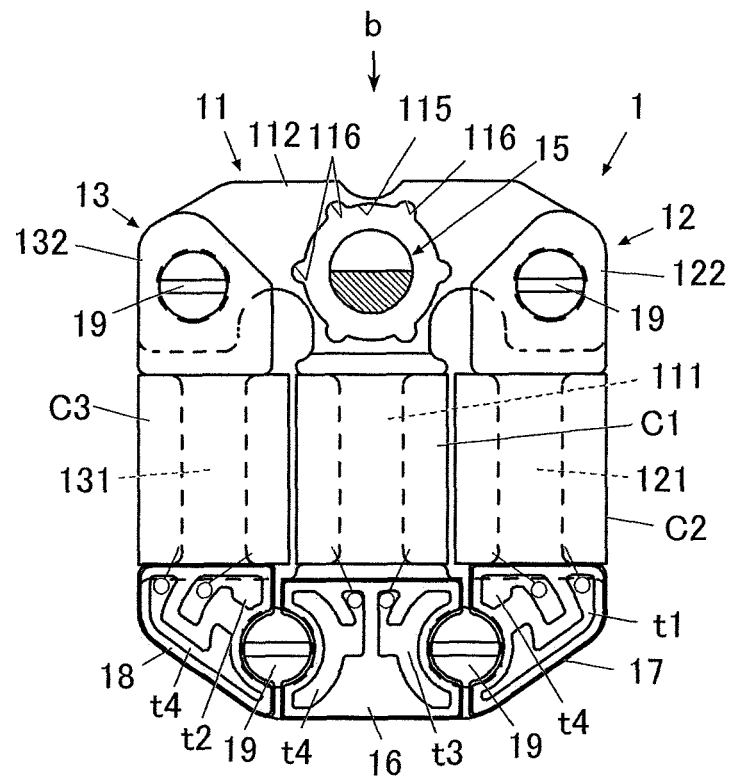
FIG. 1A is a plan view of a stepping motor according to an embodiment.
Figure 1B:
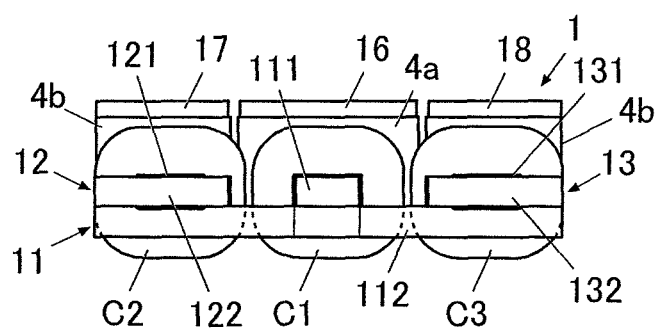
FIG. 1B is the front view of the stepping motor when seen in the direction indicated by the arrow b in FIG. 1A.

FIG. 1A is the plan view of the stepping motor according to the embodiment and FIG. 1B is the front view of the stepping motor when seen in the direction indicated by the arrow b in FIG. 1A.

As shown in FIG. 1A, the stepping motor 1 includes a stator 11, a rotor 15 and three coils C1, C2 and C3 which are magnetically connected to the stator 11.

The rotor 15 is a magnet which is two-pole magnetized in the radial direction. In FIG. 1A and the like, the white part of the rotor 15 is the S polar and the shaded part of the rotor 15 is the N polar.

In the embodiment, the rotor 15 is formed in an approximately disk shape and a rotating shaft (not shown) is provided at the center of the rotor 15.

As for the magnet used for the rotor 15, a permanent magnet such as a rare earth metal magnet (for example, a samarium-cobalt magnet and the like) or the like is preferably used, for example. However, the type of magnet used for the rotor 15 is not limited to such example.

The rotor 15 is housed in the after-mentioned rotor receiving section 115 of the stator 11 and is disposed so as to rotate around the rotating shaft, the rotating shaft being the center of rotation. In the embodiment, the rotor 15 rotates in steps of predetermined degrees (in the embodiment, 60 degrees) in the forward direction (that is, in the clock-wise direction) and in the backward direction (that is, in the counter clock-wide direction) in the rotor receiving section 115 by driving pulses being sequentially applied to the after-mentioned three coils, to one coil at a time (the first coil C1, the second coil C2, the third coil C3).

To the rotating shaft, gears or the like (not shown) forming a gear train mechanism for moving the hands of a time display device such as a watch (for example, the after-mentioned time piece 500, see FIG. 7) are connected. The rotating shaft makes the gears rotate by rotation of the rotor 15.

FIG. 2A is the plan view of the stator, FIG. 2B is a side view of the stator when seen in the direction indicated by the arrow b in FIG. 2A, FIG. 2C is the plan view showing the state where the first coil C1 and the coil substrate 16 are mounted on the stator shown in FIG. 2A and FIG. 2D is the front view of the stator when seen in the direction indicated by the arrow d in FIG. 2C.

In the embodiment, the stator 11 includes a straight part 111, a projecting part 112 which projects in the direction orthogonal to the extending direction of the straight part 111 from one side of the straight part 111 and a projecting part 113 which projects in the direction orthogonal to the extending direction of the straight part 111 from the other side of the straight part 111.

The straight part 111 forms the center yoke of the stepping motor 1.

As shown in FIGS. 2C and 2D, the first coil C1 is formed by winding a coil around the straight part 111.

Among the three coils C1, C2 and C3 of the stepping motor 1, at least one is an integrated coil which is integrally formed by winding a coil around a part of the stator 11. In the embodiment, the first coil C1 which is formed around the straight part 111 of the stator 11 is the integrated coil.

As shown in FIG. 2B, it is preferred that crushing is performed on the straight part 111 around which the first coil C1 is formed in its wide part where a magnetic flux will not be saturated so that the straight part 111 be at higher comparing to the projecting parts 112 and 113 by the thickness of the projecting parts 112 and 113.

As described later, the first side yoke 12 around which the second coil C2 is formed and the second side yoke 13 around which the third coil C3 is formed are respectively engaged with the projecting parts 112 and 113. In the state where the stepping motor 1 is assembled, the three coils C1, C2 and C3 are disposed in parallel as shown in FIG. 1A and the like. At this time, since the first side yoke 12 and the second side yoke 13 are respectively disposed so as to be layered on the projecting parts 112 and 113 of the stator 11, the heights of the parts where the second coil C2 and the third coil C3 are formed (the after-mentioned straight parts 121 and 131) will also be higher comparing to the stator 11 by the thickness of the projecting parts 112 and 113. By performing the crushing on the straight part 111 of the stator 11 so that the height of the straight part 111 be higher comparing to the projecting parts 112 and 113 by the thickness of the projecting parts 112 and 113, the heights of the three coils C1, C2 and C3 (the height of the stepping motor 1 in the thickness direction) may be adjusted so as to be approximately in flash with each other. Therefore, when mounting the stepping motor 1, it can be disposed in a small mounting space in a compact manner.

The stator 11 according to the embodiment is formed by a material having a high magnetic permeability such as permalloy C (PC), for example.

Permalloy C includes Ni=45 and Fe=Bal as its components and its initial magnetic permeability is 60000 μi, maximum magnetic permeability is 180000 μm, saturation magnetic flux density is 0.65 BM (T), coercive force is 1.2 Hc (A/m) and specific resistance is 0.55 μΩ·m or greater.

In the embodiment, as for the material for forming the after-mentioned first side yoke 12 and the second side yoke 13, permalloy B (PB) whose saturation magnetic flux density is greater than that of permalloy C (PC) and in which saturating the magnetic flux is more difficult in comparison to permalloy C (PC) is used.

Therefore, in order to make the number of windings in the first coil C1 formed in the stator 11 be the same as the number of windings in the second coil C2 and the third coil C3 respectively formed around the first side yoke 12 and the second side yoke 13, it is preferred to assure a sufficient magnetic path by making the cross section area of the straight part 111 of the stator 11 (the area of the cross section which is orthogonal to the flow of the magnetic flux) be larger (specifically, about times 1.5 to times 2) than that of the straight parts 121 and 131 of the first side yoke 12 and the second side yoke 13, respectively, so that the magnetic flux which flows through the first coil C1 will not be saturated.

At approximately center in the width direction of the projecting part 112 which is at the position where the stator 11, the first side yoke 12 and the second side yoke 13 intersect in the state where the stepping motor 1 is assembled, the rotor receiving section 115 which is an approximately circle hole and in which the rotor 15 is housed is formed.

The rotor receiving section 115 is provided with stator-side stoppers 116 along the outer circumference of the rotor 15 by having equal spaces therebetween. The stator-side stoppers 116 are for maintaining the still state of the rotor 15.

In the embodiment, the stator-side stoppers 116 are six concaves (that are, notches) formed on the inner surface of the rotor receiving section 115 of the stator 11.

With respect to the rotor 15, its index torque (holding torque) reaches its maximum in the state where any one of the stator-side stoppers 16 and the polar boundary position of the rotor 15 face each other. Therefore, in the state where a driving pulse is not applied, the rotor 15 holds still at the position where any one of the stator-side stoppers 116 and the polar boundary position of the rotor 15 face each other as shown in FIG. 1A and the like. The polar boundary position of the rotor 15 is a position on the surface of the rotor 15 located circumferentially at the center between two magnetic poles of the rotor 15. As shown in FIG. 1A, there are two polar boundary positions on the rotor 15. In case where the rotor 15 has a circular cylindrical shape, each of the polar boundary position forms a straight line on the rotor 15.

The projecting parts 112 and 113 of the stator 11 are respectively provided with two screw holes 119 through which screws 19 (see FIG. 1A and the like) for fixating the stepping motor 1 to the main plate 3 (see FIGS. 5A and 5B) and the like are to be inserted.

The coil substrate 16 is mounted on the projecting part 113 of the stator 11 at the approximately center part thereof in the width direction of the projecting part 113, avoiding the screw holes 119. The coil substrate 16 is provided with the connecting point t3 and the connecting point t4 where the terminals of the first coil C1 are connected.

In the embodiment, the coil substrates 17 and 18 which are provided respectively corresponding to the after-mentioned coils C2 and C3 of the first side yoke 12 and the second side yoke 13 cover the one halves of the screw holes 119. The coil substrates 17 and 18 are respectively provided with the connecting points t1 and t4 and the connecting points t1 and t4 in shapes that allow connection with the main substrate 2 at around the screw holes 119. The coil substrate 16 is formed in a shape that covers the other halves of the screw holes 119 and that compensates the coil substrates 17 and 18. With respect to the coil substrate 16, only the parts corresponding to the screw holes 119 are cut out and the two connecting points t3 and t4 which are to be connected with the first coil C1 extend toward the screw holes 119.

In such way, by disposing the coil substrate 16 and the coil substrates 17 and 18 so as to surround both sides of each of the screw holes 119, the stator 11 on which the coil substrate 16 is disposed and the first side yoke 12 and the second side yoke 13 on which the coil substrates 17 and 18 are respectively disposed can be fixated by being screwed by the two screws 19.

As shown in FIG. 21D and the like, a spacer 4a is disposed between the projecting part 113 and the coil substrate 16. The spacer 4a is formed to have a thickness so that the upper surface of the spacer 4a be at roughly the same height as the first coil C1. By disposing the coil substrate 16 on the spacer 4a, the coil substrate 16 is disposed roughly at the height of the first coil C1 or slightly higher than the first coil C1.

In the embodiment, the terminals of the three coils C1, C2 and C3 in the stepping motor 1 are respectively connected with the connecting points of the coil substrates 16, 17 and 18 (that is, with the connecting points t1 to t4) and are electrically connected with the after-mentioned motor drive circuit 5 (see FIG. 6).

Here, the connecting points provide electrical, magnetic and functional connections. Hereinafter, the connecting points t1, t2, t3 and t4 are such connecting points.

In the embodiment, a part of the connecting points are commonly used. Specifically, one of the terminals of each of the three coils C1, C2 and C3 is connected to the connecting point t4 and in such way, the connecting point t4 is commonly used by the three coils C1, C2 and C3.

In such way, the three coils C1, C2 and C3 are controlled by the four connecting points. If one coil is to be activated (for example, the first coil C1), the commonly used connecting point t4 and another connecting point to which the other terminal of the coil is connected (for example, the connecting point t3 in the case of the first coil C1) is made to be in the ON state so as to activate the coil (for example, the first coil C1) and the connection points to which the other terminals of the other coils (for example, the second coil C2 and the third coil C3) are connected (for example, the connection point t1 to which the second coil C2 is connected and the connecting point t2 to which the third coil C3 is connected) other than the connecting point t4 are made to be in the OFF state. Thereby, a current can be made to flow only through the activated coil (for example, the first coil C1).

Figure 3A:
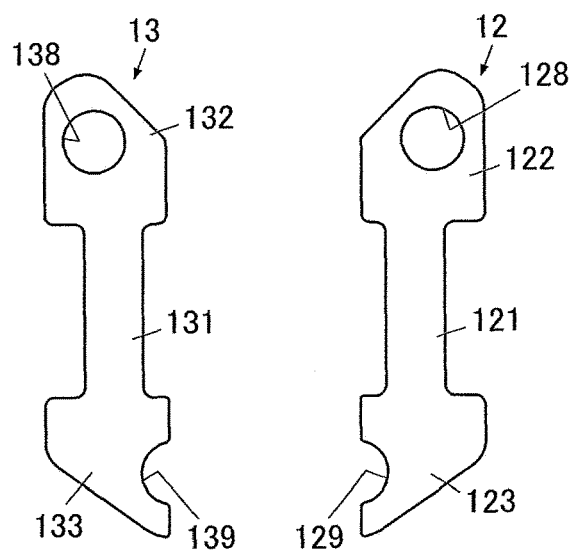
FIG. 3A is a plan view showing the first side yoke and the second side yoke.
Figure 3B:
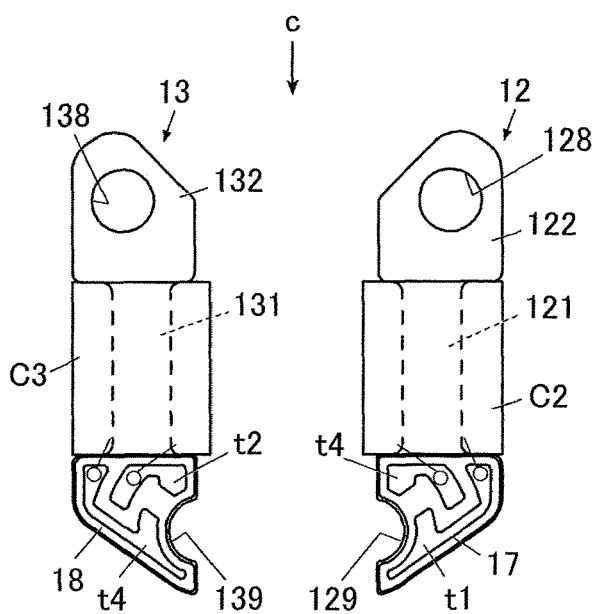
FIG. 3B is a plan view showing the first side yoke and the second side yoke where coils and coil substrates are mounted thereon.
Figure 3C:
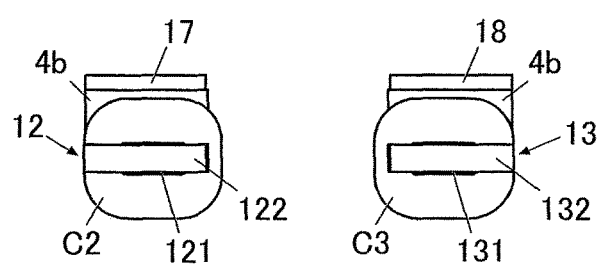
FIG. 3C is the front view showing the stator when seen in the direction indicated by the arrow c in FIG. 3B.

FIG. 3A is the plan view of the first side yoke and the second side yoke, FIG. 3B is the plan view showing the state where the second coil C2 and the third coil C3 and the coil substrates 17 and 18 are respectively mounted on the first side yoke and the second side yoke shown in FIG. 3A and FIG. 3C is the front view of the first side yoke and the second side yoke when seen in the direction indicated by the arrow c in FIG. 2B.

As shown in FIG. 1A and the like, in the embodiment, the first side yoke 12 and the third side yoke 13 are respectively disposed on both sides of the straight part 111 of the stator 11 at approximately bisymmetric positions, the straight part 111 being in the middle (in the embodiment, the first side yoke 12 is disposed on the right side in FIG. 1A and the third side yoke 13 is disposed on the left side in FIG. 1A).

The first side yoke 12 and the second side yoke 13 of the embodiment are formed by a material having a high magnetic permeability such as permalloy B (PB) or the like, for example.

Permalloy B includes Ni=77 to 78, Mo=5, Cu=4 and Fe=Bal as its components and its initial magnetic permeability is 4500 μi, maximum magnetic permeability is 45000 μm, saturation magnetic flux density is 1.50 Bm (T), coercive force is 12 Hc (A/m) and specific resistance is 0.45μΩ·m or greater.

As described above, permalloy B which is used to form the first side yoke 12 and the second side yoke 13 has greater saturation magnetic flux density and the magnetic flux does not easily saturate comparing to permalloy C which is used to form the stator 11.

Therefore, in order to make the number of windings in the first coil C1 formed in the stator 11 be the same as the number of windings in the second coil C2 and the third coil C3 respectively formed around the first side yoke 12 and the second side yoke 13, it is preferred to adjust the cross-section area of the straight part 111 of the stator 11 be larger or in other ways so that the magnetic flux which flows through the first coil C1 will not be saturated.

As shown in FIG. 3A, a first side yoke 12 includes the straight part 121, a projecting part 122 which is disposed on one side of the straight part 121, the width thereof being wider than that of the straight part 121, and a projecting part 123 which is disposed on the other side of the straight part 121, the width thereof being wider than that of the straight part 121.

As shown in FIGS. 3B and 3C, a coil is wound around the straight part 121 to form the second coil C2.

A screw hole 128 through which a screw 19 is inserted (see FIG. 1A) is formed in the projecting part 122 at the position corresponding to the screw hole 119 formed in the projecting part 112 of the stator 11 (in the embodiment, the screw hole 119 on the right side in FIGS. 2A and 2C).

A concave 129 which is cut out so as not to block the inserting of the screw 19 (see FIG. 1A and the like) is formed in the projecting part 123 at the position corresponding to the screw hole 119 formed in the projecting part 113 of the stator 11 (in the embodiment, the screw hole 119 on the right side in FIGS. 2A and 2C).

The first side yoke 12 is fixated and integrated to the stator 11 by being screwed by the screw 19 or in other ways in the state where the projecting part 122 being layered on the projecting unit 112 of the stator 11 and the projecting part 123 being layered on the projecting part 113 of the stator 11. In such way, the second coil C2 is magnetically connected with the projecting parts 112 and 113 of the stator 11.

The coil substrate 17 in a shape that matches the shape of the projecting part 123 is mounted on the projecting part 123 of the first side yoke 12 so as to cover approximately the entire surface of the projecting part 123. That is, the coil substrate 17 is formed in a shape so as to cover one half of the screw hole 119 and a cut out is formed in a shape that matches the concave 129 of the projecting part 123 at the position corresponding to the screw hole 119.

The coil substrate 17 is provided with the connecting point t1 and the connecting point t4 where the terminals of the second coil C2 are connected, the connecting points t1 and t4 being formed in shapes that allow them to come in contact with the main substrate 2 at around the screw hole 119. The second coil C2 is electrically connected with the after-mentioned motor drive circuit 5 (see FIG. 9A and the like) by the terminals thereof being connected with the connecting points t1 and t4. Among the connecting points, the connecting point t4 is commonly used by the three coils C1, C2 and C3 as described above.

As shown in FIG. 3C and the like, a spacer 4b is disposed between the projecting part 123 and the coil substrate 17. The spacer 4b is formed to have a thickness so that the upper surface of the spacer 4b be at roughly the same height as the second coil C2. By disposing the coil substrate 17 on the spacer 4b, the coil substrate 17 be disposed at roughly the same height as the second coil C2 or slightly higher than the second coil C2.

The spacer 4b is formed to have a thickness that is thinner comparing to the thickness of the spacer 4a which is disposed between the coil substrate 16 and the projecting part 113 in the stator 11 by the thickness of the projecting part 123 of the first side yoke 12.

Similarly to the first side yoke 12, the second side yoke 13 includes a straight part 131, a projecting part 132 which is disposed on one side of the straight part 131, the width thereof being wider than that of the straight part 131, and a projecting part 133 which is disposed on the other side of the straight part 131, the width thereof being wider than that of the straight part 131.

As shown in FIGS. 3B and 3C, a coil is wound around the straight part 131 to form the third coil C3.

A screw hole 138 through which a screw 19 is inserted (see FIG. 1A and the like) is formed in the projecting part 132 at the position corresponding to the screw hole 119 formed in the projecting part 112 of the stator 11 (in the embodiment, the screw hole 119 on the left side in FIGS. 2A and 2C).

A concave 139 which is cut out so as not to block the inserting of the screw 19 (see FIG. 1A and the like) is formed in the projecting part 133 at the position corresponding to the screw hole 119 formed in the projecting part 113 of the stator 11 (in the embodiment, the screw hole 119 on the left side in FIGS. 2A and 2C).

The second side yoke 13 is fixated and integrated to the stator 11 by being screwed by the screw 19 or in other ways in the state where the projecting part 132 being layered on the projecting unit 112 of the stator 11 and the projecting part 133 being layered on the projecting part 113 of the stator 11. In such way, the third coil C3 is magnetically connected with the projecting parts 112 and 113 of the stator 11.

The coil substrate 18 in a shape that matches the shape of the projecting part 133 is mounted on the projecting part 133 of the second side yoke 13 so as to cover approximately the entire surface of the projecting part 133. That is, the coil substrate 18 is formed in a shape so as to cover one half of the screw hole 119 and a cut out is formed in a shape that matches the concave 139 of the projecting part 133 at the position corresponding to the screw hole 119.

The coil substrate 18 is provided with the connecting point t2 and the connecting point t4 where the terminals of the third coil C3 are connected, the connecting points t2 and t4 being formed in shapes that allow them to come in contact with the main substrate 2 at around the screw hole 119. The third coil C3 is electrically connected with the after-mentioned motor drive circuit 5 by the terminals thereof being connected with the connecting points t2 and t4. Among the connecting points, the connecting point t4 is commonly used by the three coils C1, C2 and C3 as described above.

As shown in FIG. 3C and the like, a spacer 4b is disposed between the projecting part 133 and the coil substrate 18. The spacer 4b is formed to have a thickness so that the upper surface of the spacer 4b be at roughly the same height as the third coil C3. By disposing the coil substrate 18 on the spacer 4b, the coil substrate 18 be disposed at roughly the same height as the third coil C3 or slightly higher than the third coil C3.

The spacer 4b is formed to have a thickness that is thinner comparing to the thickness of the spacer 4a which is disposed between the coil substrate 16 and the projecting part 113 in the stator 11 by the thickness of the projecting part 133 of the second side yoke 13 and is formed to have the same thickness as the spacer 4b which is disposed between the coil substrate 17 and the projecting part 123 of the first side yoke 12.

FIG. 4A is the plan view of the stepping motor 1 in its completed state where the coil substrates 16, 17, 18 and the like are mounted thereon and FIG. 4B shows an example of the main substrate 2 on which the stepping motor 1 is mounted. In FIG. 4A, the main substrate 2 is omitted. In FIG. 4B, only the part in the main substrate 2 where the stepping motor 1 is mounted is shown.

FIG. 5A is the cross-sectional view cut along the line a-a in FIG. 4A which shows the positional relation of individual components when the stepping motor 1 is mounted on the main substrate 2 and FIG. 5B is a cross-sectional view cut along the line b-b in FIG. 4A which shows the positional relation of individual components when the stepping motor 1 is mounted on the main substrate 2.

As shown in FIG. 4A, the connecting parts where the terminals of the three coils C1, C2 and C3 connect with the connecting points t1, t2, t3 and t4 in the coil substrates 16, 17 and 18 are resin covered regions 16a, 17a and 18a where the welding protective resin for protecting the connecting parts is applied. As shown in FIG. 4B, cutouts 26, 27 and 28 are formed in the main substrate 2 at the positions corresponding to the resin covered regions 16a, 17a and 18a and when the stepping motor 1 is mounted on the main substrate 2, the resin covered regions 16a, 17a and 18a are respectively disposed in the cutouts 26, 27 and 28. In such way, spaces corresponding to the thicknesses of the resin covered regions 16a, 17a and 18a will not be generated between the main substrate 2 and the coil substrates 16, 17 and 18 of the stepping motor 1, and the stepping motor 1 can be mounted efficiently by cutting waste in the mounting space.

The main substrate 2 is provided with terminals 22a, 22b, 22c and 22d for coils to be connected. In the state where the stepping motor 1 is mounted on the main substrate 2, the connecting point t1 of the coil-side is connected to the terminal 22a, the connecting point t2 of the coil-side is connected to the terminal 22b, the connecting point t3 of the coil-side is connected to the terminal 22c and the connecting point t4 of the coil side is connected to the terminal 22d.

In such way, by the connecting points t1, t2, t3 and t4 being respectively connected with the terminals 22a, 22b, 22c and 22d for the coils to be connected, the three coils C1, C2 and C3 are electrically connected with the main substrate 2.

In the embodiment, the stepping motor 1 is to be fixated between the main substrate 2 and the main plate 3 of a module or the like which is not shown.

In the main substrate 2 at the position corresponding to the screw holes 119 of the stator 11, substrate-side screw holes 219 in which the screws 19 are to be inserted are formed.

In the main plate 3 at the position corresponding to the screw holes 119 of the stator 11, hollow supporting column members 31 in which the tips of the screws 19 are to be inserted are formed. With respect to the fixation of the screws 19 in the supporting column members 31, fitting screw parts (not shown) are formed in the supporting column members 31 and on the outer circumferences of the screws 19 and the screws 19 and the supporting column members 31 are respectively screwed to each other, for example. However, the method for fixating the screws 19 in the supporting column members 31 is not limited to such example. For example, the screws 19 and the supporting column members 31 can be fixated by pressing the tips of the screws 19 in the supporting column members 31 of the main plate 3.

FIG. 5A is a cross-sectional view cut along the line a-a in FIG. 4A when the stepping motor 1 is mounted between the main substrate 2 and the main plate 3 and FIG. 5B is a cross-sectional view cut along the line b-b in FIG. 4A.

As shown in FIGS. 5A and 5B, the stepping motor 1 is fixated to the main substrate 2 by inserting the screws 19 in the substrate-side screw holes 219 of the main substrate 2 toward the stepping motor 1 side and by screwing the tips of the screws 19 in the supporting columns members 31 of the main plate 3.

As described above, the spacers 4b which are disposed between the coil substrate 17 disposed on the first side yoke 12 and the projecting part 123 and between the coil substrate 18 disposed on the second side yoke 13 and the projecting part 133 are thinner comparing to the spacer 4a which is disposed between the coil substrate 16 disposed on the stator 11 and the projecting part 113 by the thickness of the projecting parts 123 and 133 (see FIGS. 5A and 5B). Therefore, as shown in FIG. 1B, the three coil substrates 16, 17 and 18 are disposed so as to be approximately in flash with each other in the state where the stepping motor 1 is assembled. Thus, the entire stepping motor 1 is formed in a compact form which can be easily mounted.

Next, the motor drive device for driving the stepping motor 1 according to the embodiment will be described. In the embodiment, the motor drive device includes the after-mentioned driving pulse generator 651, switching elements 51 to 58 (after-mentioned) and a motor drive circuit 5.

Figure 7:
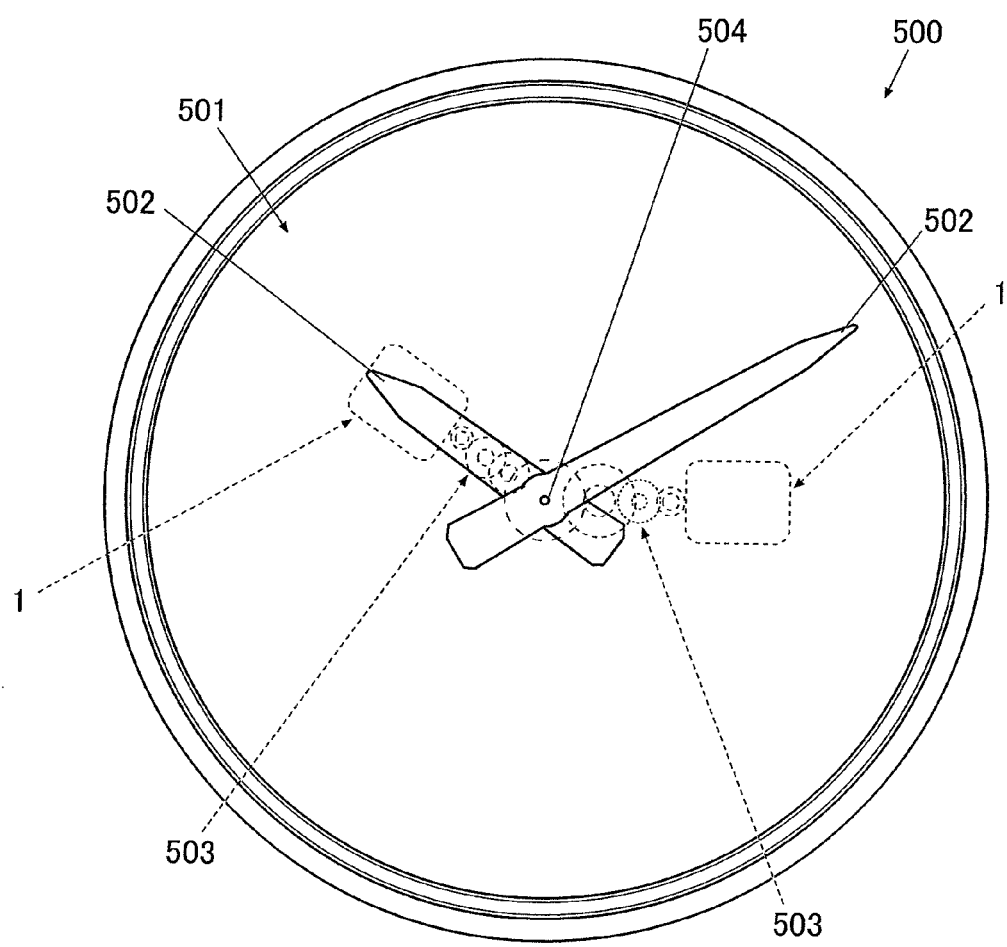
FIG. 7 is a plan view showing an example of a time piece to which the stepping motor and the motor drive device shown in the embodiment are applied.

As described above, the stepping motor 1 of the embodiment is for driving the hand moving mechanism which moves the hands 502 (see FIG. 7) of the time piece 500 (see FIG. 7).

FIG. 6 is a block diagram of the main components showing the controlling structure according to the embodiment.

As shown in FIG. 6, the time piece 500 includes a controller 6 for controlling the operation of individual components of the time piece.

The controller 6 includes a CPU (Central Processing Unit) 61, a ROM (Read Only Memory) 62, a RAM (Random Access Memory) 63, an oscillator (indicated as "OSC" in FIG. 6) 64, a motor controller 65 and the like.

Although the configuration of the controller 6 is not specifically limited, it is configured by including a LSI (Large Scale Integration) or the like, for example.

The CPU 61 outputs various types of commands to the motor controller 65 on the basis of the control program stored in the ROM 62. The RAM 63 is used as the working memory of the CPU 61. In combination with an oscillator (not shown), the oscillator 64 generates unique frequency signals and outputs an operation clock to the CPU 61 and the like.

The motor controller 65 includes a driving pulse generator 651 which generates driving pulses and outputs the driving pulses to the motor drive circuit 5, the rotation detection determinator 652 which determines whether the rotor 15 rotates normally, the first switching unit 653 and the like.

The driving pulse generator 651 outputs a driving pulse to a switching element (in the embodiment, the first switching unit 653 including switching elements 51 to 58 (after-mentioned)) when driving the stepping motor 1. In the embodiment, the driving pulse generator 651 outputs driving pulses to the switching elements 51 to 58 so that a current for driving the coils C1, C2 and C3 flows through one path.

By the driving pulse generator 651 outputting the driving pulses to the switching elements 51 to 58, magnetic poles (the first magnetic pole, the second magnetic pole and the third magnetic pole) are generated at positions in the stator 11 of the stepping motor 1 along the outer circumference of the rotor 15, the positions corresponding to the ⅓ positions of the outer circumference of the rotor.

In the embodiment, the driving pulse generator 651 outputs driving pulses to the switching elements 51 to 58 as needed so as to sequentially drive the coils C1, C2 and C3 in the stepping motor 1, one coil at a time. In such way, the polarities of the magnetic poles (the first magnetic pole, the second magnetic pole and the third magnetic pole) which are generated along the outer circumference of the rotor 15 are sequentially switched.

The first switching unit 653 includes the switching elements 51 to 58 which are inner switches provided inside the controller 6 which is formed of a LSI or the like and the first switching unit 653 controls the path through which the current for driving the coils C1, C2 and C3, flows.

The motor drive circuit 5 of the embodiment is a bridge circuit which drives the stepping motor 1 provided with three coils C1, C2 and C3. In the motor drive circuit 5, a current flows through a predetermined path by the switching elements 51 to 58 (after-mentioned) being switched between ON and OFF as needed in accordance with the driving pulses which are output from the driving pulse generator 651.

FIGS. 9A to 9F show circuits showing structure examples of the motor drive circuit 5 according to the embodiment.

As shown in FIGS. 9A to 9F, in the motor drive circuit 5 of the embodiment, the power voltage Vcc (not shown) is applied between the voltage input terminal 59 and the ground terminal 60. Between the voltage input terminal 59 and the ground terminal 60, three coils C1, C2 and C3 and a plurality of switching elements 51 to 58 (inner switches provided inside the controller 6 which is formed of a LSI or the like) which are formed of FETs (Field Effect Transistors) or the like are disposed.

In particular, the switching element 51 is disposed between the voltage input terminal 59 and the connecting point t1 which is connected with the second coil C2, the switching element 52 is disposed between the voltage input terminal 59 and the connecting point t2 which is connected with the third coil C3 and the switching element 53 is disposed between the voltage input terminal 59 and the connecting point t3 which is connected with the first coil C1. The switching element 54 is disposed between the voltage input terminal 59 and the connecting point t4 which is the commonly used connecting point to which the three coils C1, C2 and C3 are connected.

The switching element 55 is disposed between the connecting point t1 and the ground terminal 60, the switching element 56 is disposed between the connecting point t2 and the ground terminal 60, the switching element 57 is disposed between the connecting point t3 and the ground terminal 60 and the switching element 58 is disposed between the connecting point t4 and the ground terminal 60.

The configuration of the motor drive circuit 5 is not limited to such example and can be modified as needed.

FIG. 7 is a schematic view showing a structure example of a case where the stepping motor 1 and the motor drive device of the embodiment is applied as the drive source to drive the hand moving mechanism (gear train mechanism) of the hands of a time display device such as a watch.

As shown in FIG. 7, the stepping motor 1 and the motor drive device of the embodiment are used as the drive source for making the hand moving mechanism (gear train mechanism) 503 operate so as to move the hands 502 (in FIG. 7, only the hour hand and the minute hand are shown. The hands are not limited to the example shown in the drawing.) of the time piece 500 which is a time display device provided with an analog display 501, for example.

In such case, the rotating shaft of the rotor 15 is connected with a gear in the hand moving mechanism (gear train mechanism) 503. In such way, when the rotor 15 of the stepping motor 1 rotates, a hand 502 rotates in the analog display 501, with the hand shaft 504 being the center, via the hand moving mechanism 503.

In such way, in a case where the stepping motor 1 of the embodiment is applied as the drive source to drive the hand moving mechanism of a time piece, the motor drive device controls the stepping motor 1 so that the three coils C1, C2 and C3 sequentially be applied current, one coil at a time.

Next, the operation of the stepping motor 1 and the motor drive device according to the embodiment will be described.

When the stepping motor 1 is to be assembled, first, crushing of the straight part 111 of the stator 11 is carried out so that the straight part 111 be higher comparing to the projecting parts 112 and 113 by the thickness of the projecting parts 112 and 113 and then, the first coil C1 is formed by winding a coil around the straight part 111. Thereafter, the second coil C2 is formed by winding a coil around the straight part 121 of the first side yoke 12 and the third coil C3 is formed by winding a coil around the straight part 131 of the second side yoke 13.

In the embodiment, the three coils C1, C2 and C3 are formed with the same number of windings (the number of turns). The number of windings in each of the coils C1, C2 and C3 may be changed as needed according to the material, the cross-section area, etc. of each of the straight parts 111, 121, 131 around which the coils C1, C2 and C3 are respectively formed.

Next, the positions of the screw holes 119 in the stator 11 and the screw holes 128 and 138 in the first side yoke 12 and the second side yoke 13 are matched and the projecting part 112 of the first side yoke 12 and the projecting part 132 of the second side yoke 13 are layered on the projecting part 112 of the stator 11. At this time, although the stator 11 is lower than the first side yoke 12 and the second side yoke 13, the heights of the three coils C1, C2 and C3 will be approximately in flash with each other (see FIG. 1B) since crushing is performed on the straight part 111 of the stator 11 as described above.

Then, the spacer 4a is placed at the approximately center of the projecting part 113 of the stator 11 and place the coil substrate 16 is placed on the spacer 4a.

The spacer 4b which is thinner comparing to the spacer 4a by the thickness of the projecting part 123 is placed on the projecting part 123 of the first side yoke 12 and the coil substrate 17 is placed on the spacer 4b. Similarly, the spacer 4b which is thinner comparing to the spacer 4a by the thickness of the projecting part 133 is placed on the projecting part 133 of the second side yoke 13 and the coil substrate 18 is placed on the spacer 4b. In such way, the coil substrates 16, 17 and 18 are slightly higher than the coils C1, C2 and C3 and the three coil substrates 16, 17 and 18 are aligned so as to be approximately in flash with each other (see FIG. 1B).

Next, the terminals of the first coil C1 are connected to the connecting points t3 and t4 of the coil substrate 16, the terminals of the second coil C2 are connected to the connecting points t1 and t4 of the coil substrate 17 and the terminals of the third coil C3 are connected to the connecting points t2 and t4 of the coil substrate 18. Thereafter, the protective resin is applied to the connecting parts to form the resin covered regions 16a, 17a and 18a.

When connecting of the individual parts of the stepping motor 1 is completed, the stepping motor 1 in this state is adjusted so that the positions of the screw holes 119 match the positions of the supporting column members 31 and place the stator 11, the first side yoke 12 and the second side yoke 13 (the stepping motor 1) on the main plate 3. Then, the substrate-side screw holes 219 in the main substrate 2 are matched to the positions of the supporting column members 31 and the screw holes 119 and the main substrate 2 is places on the stepping motor 1 from the above. Thereafter, the screws 19 are inserted in the substrate-side screw holes 219 and the screw holes 119 in the stator 11, two of each are formed at the positions corresponding to the projecting part 112 and the projecting part 113, and the screws 19 are screwed in so that the tips of the screws 19 be fixated inside the supporting column members 31 of the main plate 3. In such way, the stator 11, the first side yoke 12 and the second side yoke 13 are tightened together by the screw 19 and the stepping motor 1 is fixated to the main plate 3 and the main substrate 2. Further, by the stepping motor 1 being fixated to the main substrate 2, the terminals of the coils C1, C2 and C3 connected to the coil substrates 16, 17 and 18 are electrically connected with the terminals 22a to 22d for the coils to be connected on the main substrate 2.

As described above, since the heights of the coils C1, C2 and C3 are approximately in flash with each other and the heights of the coil substrates 16, 17 and 18 are approximately in flash with each other, the stepping motor 1 will not move when it is fixated to the main plate 3 and the main substrate 2 and the stepping motor 1 can be mounted efficiently with no waste in the mounting space.

Next, with reference to FIGS. 8A to 8F and FIGS. 9A to 9F, the operation control of the stepping motor 1 carried out by the motor drive device according to the embodiment will be described.

Figure 8C:
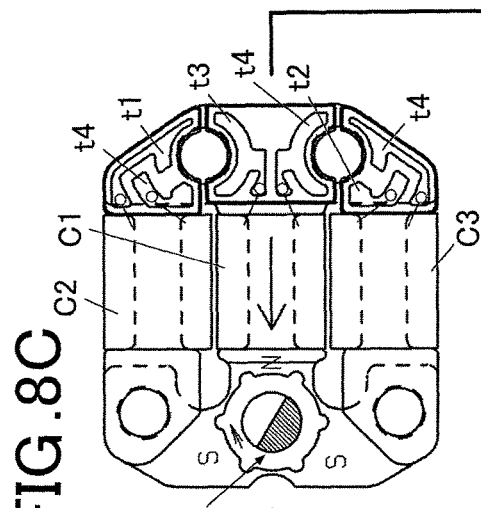
FIG. 8C shows a magnetic flux which flows through a coil in the stepping motor according to the first embodiment and shows the state where the third driving pulse is applied.
Figure 8D:
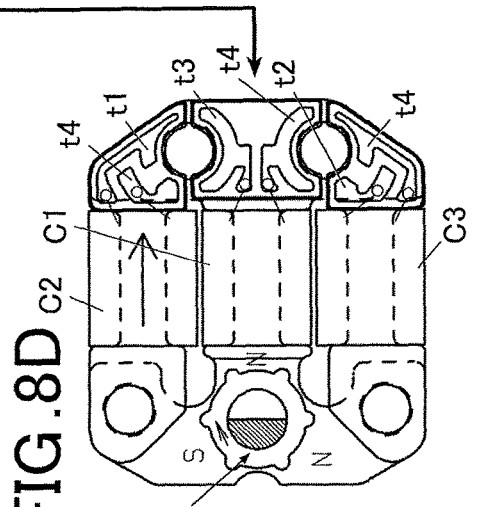
FIG. 8D shows a magnetic flux which flows through a coil in the stepping motor according to the first embodiment and shows the state where the fourth driving pulse is applied.
Figure 8B:
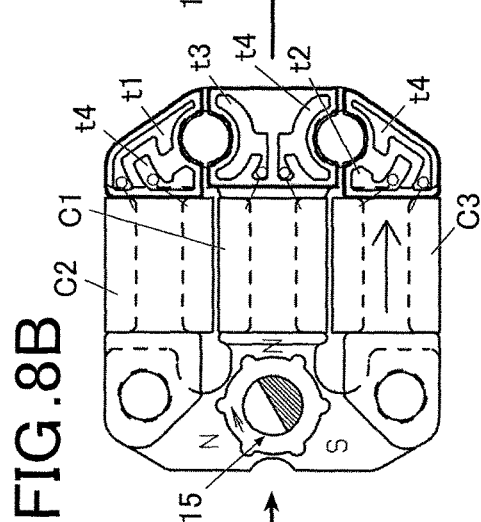
FIG. 8B shows a magnetic flux which flows through a coil in the stepping motor according to the first embodiment and shows the state where the second driving pulse is applied.
Figure 8E:
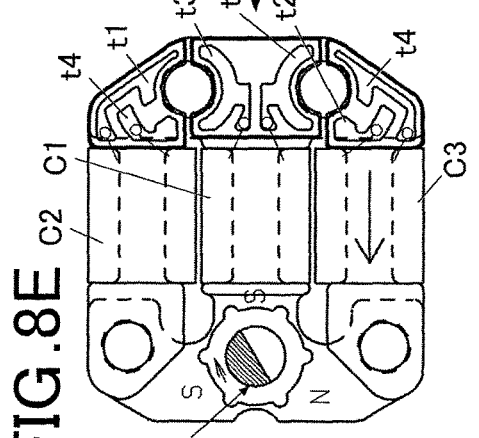
FIG. 8E shows a magnetic flux which flows through a coil in the stepping motor according to the first embodiment and shows the state where the fifth driving pulse is applied.
Figure 8A:
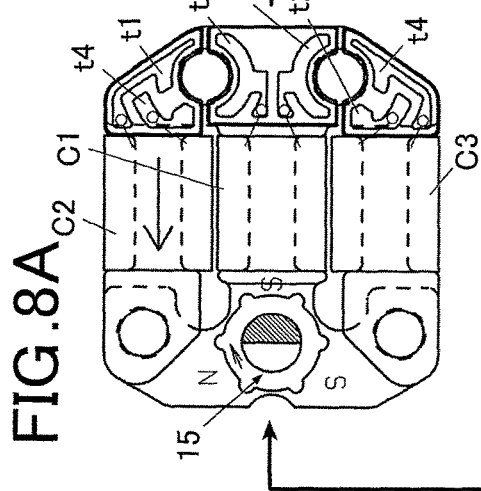
FIG. 8A shows a magnetic flux which flows through a coil in the stepping motor according to the first embodiment and shows the initial state when the first driving pulse is applied.

FIGS. 8A to 8F show the positions of the rotor 15 in its rotating direction and the flow of the magnetic fluxes (indicated by the arrows in the drawings) which flows through the coils C1, C2 and C3 in the case where the rotor 15 rotates in the forward direction (that is, the rotor 15 rotates in the clock-wide direction indicated by the arrows in FIG. 8A and the like). Here, "S" and "N" around the rotor receiving section 115 indicate the polarities of the magnetic poles (the first magnetic pole, the second magnetic pole, and the third magnetic pole) which are generated around the rotor receiving section 115 when current is applied.

FIGS. 9A to 9F correspond to FIGS. 8A to 8F and each of the arrows in the drawings indicates a current flow.

Figure 9A:
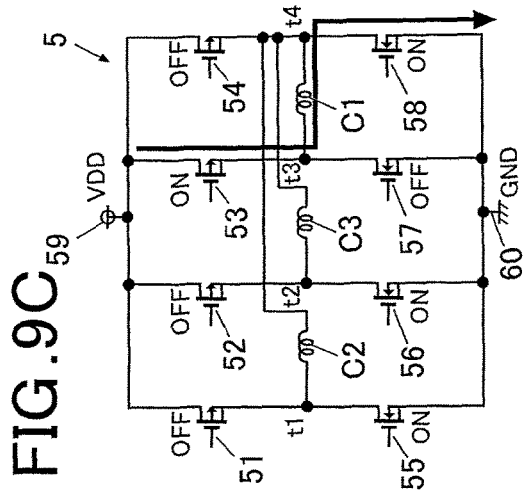
FIG. 9A shows a circuit of a current which flows through the motor drive circuit according to the first embodiment and this circuit corresponds to FIG. 8A.

First, under the control of the driving pulse generator 651, the switching elements 51, 56, 57 and 58 in the motor drive circuit 5 are made to be in the ON state and the switching elements 52, 53, 54 and 55 are made to be in the OFF state. In such way, as shown in FIGS. 8A and 9A, the power voltage Vcc is applied to the second coil C2 and the current flows to the direction toward the connecting point t4 from the connecting point t2.

At this time, three magnetic poles are generated in the stator 11 as shown in FIG. 8A and the N pole of the rotor 15 faces the S pole on the stator 11 side, the polar boundary position of the rotor 15 faces one of the stator-side stoppers 116 and the rotor 15 holds still at this position. Hereinafter, this position is called the "initial position".

Figure 9F:
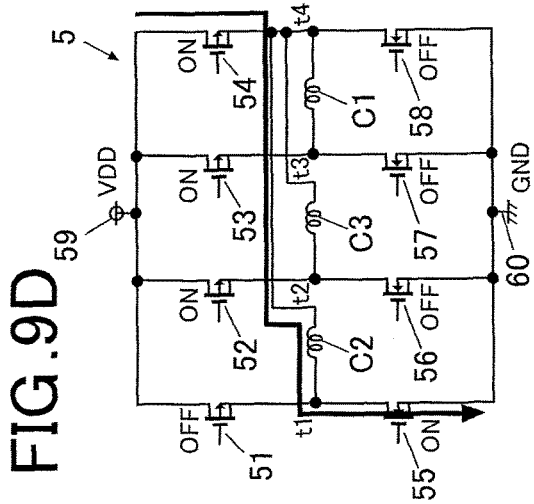
FIG. 9F shows a circuit of a current which flows through the motor drive circuit according to the first embodiment and this circuit corresponds to FIG. 8F.
Figure 9B:
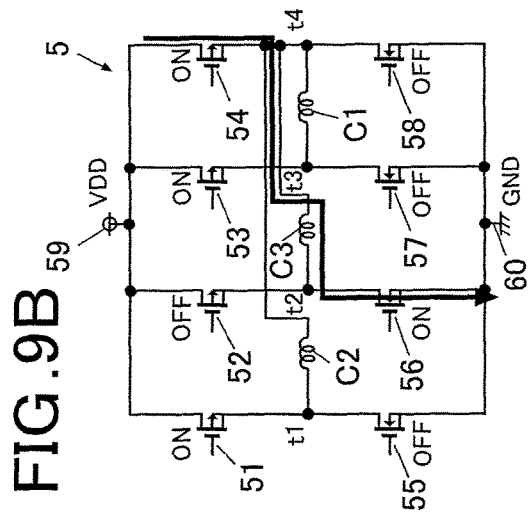
FIG. 9B shows a circuit of a current which flows through the motor drive circuit according to the first embodiment and this circuit corresponds to FIG. 8B.

Next, under the control of the driving pulse generator 651, the switching element 51, 53, 54 and 56 in the motor drive circuit 5 are made to be in the ON state and the switching elements 52, 55, 57 and 58 are made to be in the OFF state. In such way, as shown in FIGS. 8B and 9B, the power voltage Vcc is applied to the third coil C3 and the current flows in the direction toward the connecting point t2 from the connecting point t4.

At this time, three magnetic poles are generated in the stator 11 as shown in FIG. 8B and the rotor 15 rotate 60 degrees in the clock-wise direction from the initial position, the S pole of the rotor 15 faces the N pole on the stator 11 side, the polar boundary position of the rotor 15 faces one of the stator-side stoppers 116 and the rotor 15 holds still at this position.

Next, under the control of the driving pulse generator 651, the switching elements 53, 55, 56 and 58 are made to be in the ON state and the switching elements 51, 52, 54 and 57 are made to be in the OFF state. In such way, as shown FIGS. 8C and 9C, the power voltage Vcc is applied to the first coil C1 and the current flows in the direction toward the connecting point t4 from the connecting point t3.

At this time, three magnetic poles are generated in the stator 11 as shown in FIG. 8C and the rotor 15 rotate 120 degrees in the clock-wise direction from the initial position, the N pole of the rotor 15 faces the S pole on the stator 11 side, the polar boundary position of the rotor 15 faces one of the stator-side stoppers 116 and the rotor 15 holds still at this position.

Figure 9E:
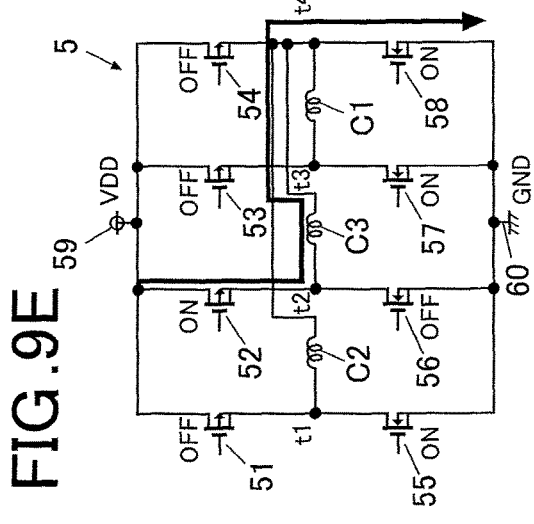
FIG. 9E shows a circuit of a current which flows through the motor drive circuit according to the first embodiment and this circuit corresponds to FIG. 8E.
Figure 9C:
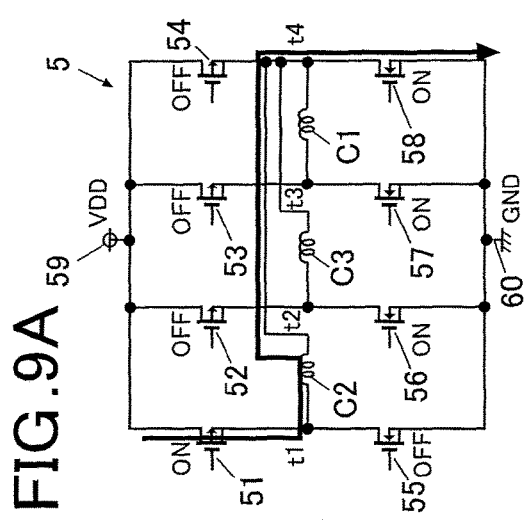
FIG. 9C shows a circuit of a current which flows through the motor drive circuit according to the first embodiment and this circuit corresponds to FIG. 8C.
Figure 9D:
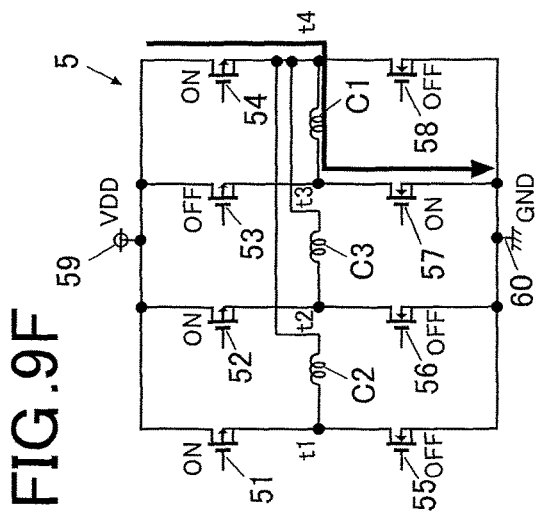
FIG. 9D shows a circuit of a current which flows through the motor drive circuit according to the first embodiment and this circuit corresponds to FIG. 8D.

Next, under the control of the driving pulse generator 651, the switching elements 52, 53, 54 and 55 in the motor drive circuit 5 are made to be in the ON state and the switching elements 51, 56, 57 and 58 are made to be in the OFF state. In such way, as shown in FIGS. 8D and 9D, the power voltage Vcc is applied to the second coil C2 and the current flows in the direction toward the connecting point t1 from the connecting point t4.

At this time, three magnetic poles are generated in the stator 11 as shown in FIG. 8D and the rotor 15 rotate 180 degrees in the clock-wise direction from the initial position, the S pole of the rotor 15 faces the N pole on the stator 11 side, the polar boundary position of the rotor 15 faces one of the stator-side stoppers 116 and the rotor 15 holds still at this position.

Next, under the control of the driving pulse generator 651, the switching elements 52, 55, 57 and 58 in the motor drive circuit 5 are made to be in the ON state and the switching elements 51, 53, 54 and 56 are made to be in the OFF state. In such way, as shown in FIGS. 8E and 9E, the power voltage Vcc is applied to the third coil C3 and the current flows in the direction toward the connecting point t4 from the connecting point t2.

At this time, three magnetic poles are generated in the stator 11 as shown in FIG. 8E and the rotor 15 rotate 240 degrees in the clock-wise direction from the initial position, the N pole of the rotor 15 faces the S pole on the stator 11 side, the polar boundary position of the rotor 15 faces one of the stator-side stoppers 116 and the rotor 15 holds still at this position.

Further, under the control of the driving pulse generator 651, the switching elements 51, 52, 54 and 57 in the motor drive circuit 5 are made to be in the ON state and the switching elements 53, 55, 56 and 58 are made to be in the OFF state. In such way, as shown in FIGS. 8F and 9F, the power voltage Vcc is applied to the first coil C1 and the current flows in the direction toward the connecting point t3 from the connecting point t4.

Figure 8F:
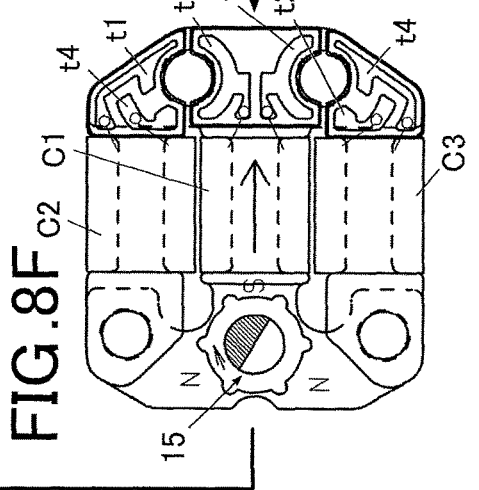
FIG. 8F shows a magnetic flux which flows through a coil in the stepping motor according to the first embodiment and shows the state where the sixth driving pulse is applied.

At this time, three magnetic poles are generated in the stator 11 as shown in FIG. 8F and the rotor 15 rotate 300 degrees in the clock-wise direction from the initial position, the S pole of the rotor 15 faces the N pole on the stator 11 side, the polar boundary position of the rotor 15 faces one of the stator-side stoppers 116 and the rotor 15 holds still at this position.

Further, by making the switching elements 51, 56, 57 and 58 in the motor drive circuit 5 be in the ON state and the switching elements 52, 53, 54 and 55 be in the OFF state under the control of the driving pulse generator 651 again, the state returns to the state as shown in FIGS. 8A and 9A and the rotor 15 returns to its original position after rotating 360 degrees from the initial position.

In such way, in a case where the rotor 15 is made to rotate one step at a time (in the embodiment, in units of 60 degrees), the driving pulse generator 651 outputs the driving pulses to the motor drive circuit 5 so that the current for driving the coils C1, C2 and C3 flows through one path in the embodiment. In particular, the driving pulse generator 651 outputs the driving pulses to the motor drive circuit 5 so that only one of the coils C1, C2 and C3 be driven in order to sequentially drive the coils C1, C2 and C3 one coil at a time. Therefore, comparing to a case where two or more coils are in parallel and made to be applied current, the power can be saved even more.

As described above, according to the embodiment, the stepping motor 1 is provided with three coils C1, C2 and C3 and at least one of the three coils C1, C2 and C3 (in the embodiment, the first coil C1) is the integrated coil which is integrally formed with the stator by winding a coil around a part of the stator 11. Therefore, the stepping motor 1 including three coils C1, C2 and C3 can be made to have the minimum mounting area without complicating or enlarging the configuration of the stepping motor 1. Such stepping motor can be used in a small size watch or the like which requires high density mounting.

The stator 11 includes the straight part ill and the first coil C1 which is the integrated coil formed integrally with the stator 11 is formed by winding a coil around the straight part 111. Therefore, similarly to the case where a coil is wound around a coil core which is exclusively used for forming a coil, the winding of a coil can be carried out evenly around the straight part 111.

Further, the other coils of the three coils C1, C2 and C3 (in the embodiment, the second coil C2 and the third coil C3) are magnetically connected with the projecting part 113 of the stator 11. In such way, all of the three coils can operate as the coils forming the stepping motor 1. In the state before the stepping motor 1 is assembled, the coils are individual components and they can be assembled to be integrated after completing each coil by winding a coil around each winding part. Therefore, the stepping motor 1 including three coils C1, C2 and C3 can be made without degrading the assembling efficiency of the stepping motor 1.

Moreover, the rotor receiving section 115 is provided with the stator-side stoppers 116 around the outer circumference of the rotor 15 with approximately equal spaces therebetween and the rotor 15 holds still at the position where the polar boundary position of the rotor 15 and any one of the stator-side stoppers 116 face each other. In such way, by having the stator-side stoppers 116, it can be assured that the rotor 15 holds still at a desired position and a highly precise motor can be made.

Further, in the embodiment, the stator 11, the first side yoke 12 and the second side yoke 13 are tightened together by four screws 19 to be fixated to the main plate 3 and the main substrate 2. In such way, the waste in the mounting area can be cut, the manufacturing cost can be reduced by the number of components being reduced and the assembling efficiency can be improved.

Traditionally, in order to drive three coils, total of six terminals, two terminals per coil, were required and this has been a problem in downsizing of an IC chip, for example. The embodiment solves such problem by having four connecting points where one terminal of each coil is commonly connected to one of the connecting points. Therefore, the mounting area can be made smaller and an efficient and highly precise mounting can be realized.

As for a rotor of a stepping motor which can realize rotation in small steps such as in steps of 60 degrees or the like, different types of magnets may be used. However, it is difficult to form a different type of magnet in an extremely small size that can be embedded in a motor of a watch or the like and leads to creating a great deal of burden and increase in the cost. Even if a different type of magnet could be formed in such extremely small size, it is extremely difficult to match the magnetizing directions in a different type of magnet and this is not realistic. The embodiment solves such problem by using a disk shaped magnet which is two-pole magnetized in the radius direction as the rotor 15 of the stepping motor 1. Comparing to the case where a different type of magnet is used, manufacturing is easy and can also be easily assembled in a rotor.

In a case of a stepping motor including two coils, there are steps which readily receive the influence of the back electromotive force of the coils and steps which does not receive such influence in the steps with respect to the yokes at three positions (center yoke and a pair or side yokes). Therefore, the step angles easily become uneven and it is difficult to smoothly rotate the rotor. If such stepping motor is used in the motor for operating the hands of a time piece, smooth hand movement cannot be realized. The embodiment solves such problem by having three coils C1, C2 and C3 and by sequentially driving the three coils one coil at a time to rotate the rotor 15. In such way, the step angles are stable and the rotor 15 can rotate smoothly and thus, a highly accurate stepping motor can be made. In such way, a smooth hand movement can be realized and this is especially effective in the case of sweep movement of the second hand, for example.

Further, in the embodiment, a part of the connecting points t1 to t4 to which the terminals of the three coils C1, C2 and C3 are connected (in the embodiment t4) is commonly used. Therefore, the wiring, the circuit structure and the like can be simplified.

Moreover, in the embodiment, the driving pulse generator 651 outputs driving pulses to the switching elements 51 to 58 in the first switching unit 653 as needed so that the current for driving the coils C1, C2 and C3 flows through one path. In particular, the driving pulse generator 651 output driving pulses so as to sequentially drive the three coils C1, C2 and C3 in the stepping motor 1 one coil at a time. Therefore, even though the stepping motor includes three coils C1, C2 and C3, the power can be saved more comparing to the case where a current flows through two or more paths.

Further, by the driving pulse generator 651 outputting driving pulses to the switching elements 51 to 58 as needed so as to sequentially drive the three coils C1, C2 and C3 one coil at a time, the polarities of the first magnetic pole, the second magnetic pole and the third magnetic pole which are generated in the stator 11 can be sequentially switched. In such way, the rotor 15 can be made to rotate in accurate step angles and a highly precise stepping motor 1 can be made while saving the power.

The controlling of output of driving pulses to the switching elements 51 to 58 by the driving pulse generator 651 is not limited to the example described in the embodiment.

For example, the coils other than the coil which is driven may be in the high impedance state.

Here, the example where the coils other than the coil which is driven are in the high impedance state will be described with reference to FIGS. 10A to 10F. FIGS. 10A to 10F corresponds to FIGS. 8A to 8F, respectively.

Figure 10A:
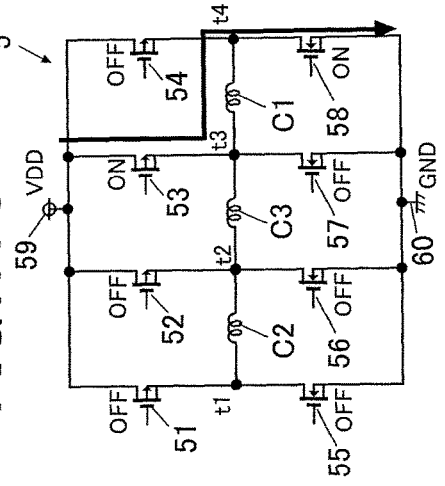
FIG. 10A shows a circuit of a current which flows through the motor drive circuit according to a modification of the first embodiment and this circuit corresponds to FIG. 8A.

First, in a case where only the second coil C2 is made to be applied current in the initial state, the driving pulse generator 651 controls the motor drive circuit 5 by outputting driving pulses to the switching elements 51 to 58 in the first switching unit 653 as needed so as to only make the switching elements 51 and 56 be in the ON state and to make the other switching elements be in the OFF state. In such way, as shown in FIGS. 8A and 10A, the power voltage Vcc is applied only to the second coil C2, the current paths are blocked in the other coils which are the first coil C1 and the third coil C3 (that is, the first coil C1 and the third coil C3 are virtually cut off from the motor drive circuit 5) and the first coil C1 and the third coil C3 are made to be in the high impedance state.

Figure 10B:
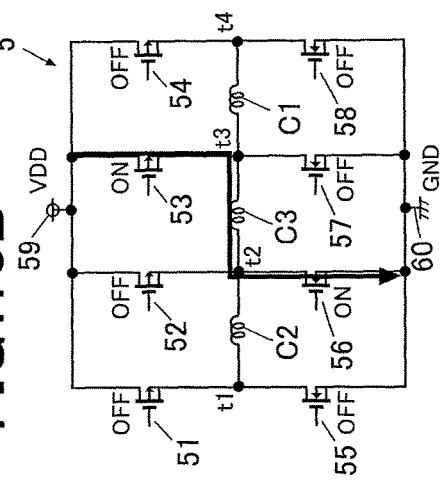
FIG. 10B shows a circuit of a current which flows through the motor drive circuit according to the modification of the first embodiment and this circuit corresponds to FIG. 8B.

In the case where the rotor 15 is made to rotate 60 degrees from the initial state, in order to only make the third coil C3 be applied current, the driving pulse generator 651 controls the motor drive circuit 5 by outputting driving pulses to the switching elements 51 to 58 in the first switching unit 653 as needed so as to only make the switching elements 53 and 56 be in the ON state and the other switching elements be in the OFF state. In such way, as shown in FIGS. 8B and 10B, the power voltage Vcc is applied only to the third coil C3, the current paths are blocked in the other coils which are the first coil C1 and the second coil C2 (that is, the first coil C1 and the second coil C2 are virtually cut off from the motor drive circuit 5) and the first coil C1 and the second coil C2 are made to be in the high impedance state.

Figure 10C:
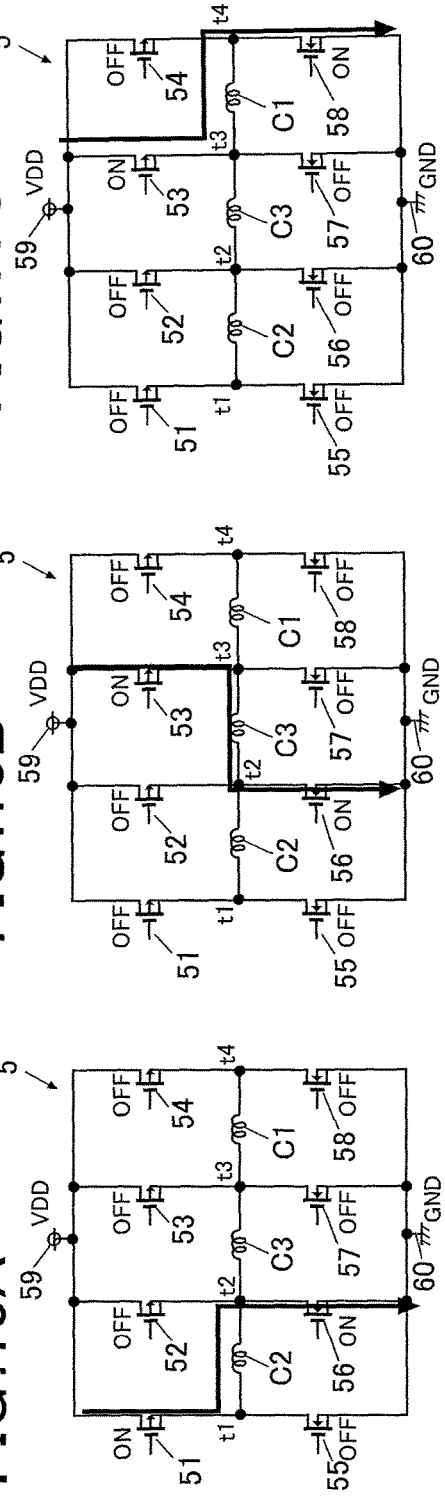
FIG. 10C shows a circuit of a current which flows through the motor drive circuit according to the modification of the first embodiment and this circuit corresponds to FIG. 8C.

In the case where the rotor 15 is made to rotate 120 degrees from the initial state, in order to only make the first coil C1 be applied current, the driving pulse generator 651 controls the motor drive circuit 5 by outputting driving pulses to the switching elements 51 to 58 in the first switching unit 653 as needed so as to only make the switching elements 53 and 58 be in the ON state and the other switching elements be in the OFF state. In such way, as shown in FIGS. 8C and 10C, the power voltage Vcc is applied only to the first coil C1, the current paths are blocked in the other coils which are the second coil C2 and the third coil C3 (that is, the second coil C2 and the third coil C3 are virtually cut off from the motor drive circuit 5) and the second coil C2 and the third coil C3 are made to be in the high impedance state.

Figure 10D:
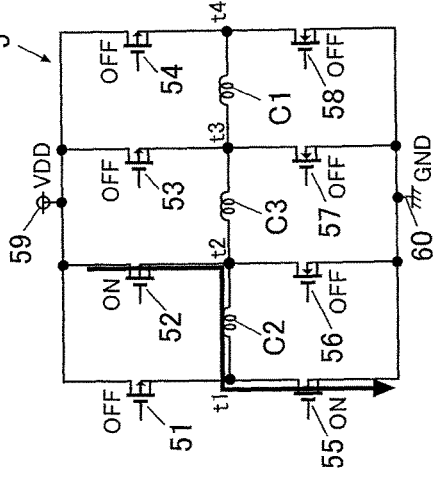
FIG. 10D shows a circuit of a current which flows through the motor drive circuit according to the modification of the first embodiment and this circuit corresponds to FIG. 8D.

In the case where the rotor 15 is made to rotate 180 degrees from the initial state, in order to only make the second coil C2 be applied current, the driving pulse generator 651 controls the motor drive circuit 5 by outputting driving pulses to the switching elements 51 to 58 in the first switching unit 653 as needed so as to only make the switching elements 52 and 55 be in the ON state and the other switching elements be in the OFF state. In such way, as shown in FIGS. 8D and 10D, the power voltage Vcc is applied only to the second coil C2, the current paths are blocked in the other coils which are the first coil C1 and the third coil C3 (that is, the first coil C1 and the third coil C3 are virtually cut off from the motor drive circuit 5) and the first coil C1 and the third coil C3 are made to be in the high impedance state.

Figure 10E:
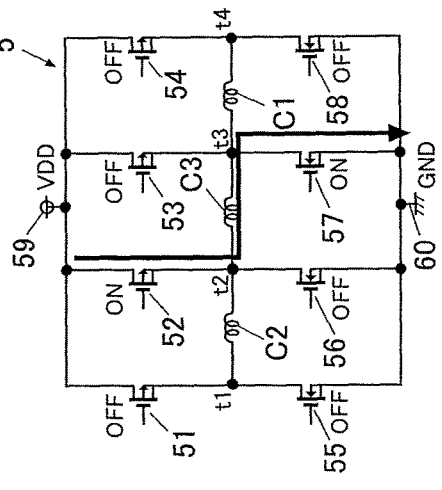
FIG. 10E shows a circuit of a current which flows through the motor drive circuit according to the modification of the first embodiment and this circuit corresponds to FIG. 8E.

In the case where the rotor 15 is made to rotate 240 degrees from the initial state, in order to only make the third coil C3 be applied current, the driving pulse generator 651 controls the motor drive circuit 5 by outputting driving pulses to the switching elements 51 to 58 in the first switching unit 653 as needed so as to only make the switching elements 52 and 57 be in the ON state and the other switching elements be in the OFF state. In such way, as shown in FIGS. 8E and 10E, the power voltage Vcc is applied only to the third coil C3, the current paths are blocked in the other coils which are the first coil C1 and the second coil C2 (that is, the first coil C1 and the second coil C2 are virtually cut off from the motor drive circuit 5) and the first coil C1 and the second coil C2 are made to be in the high impedance state.

Figure 10F:
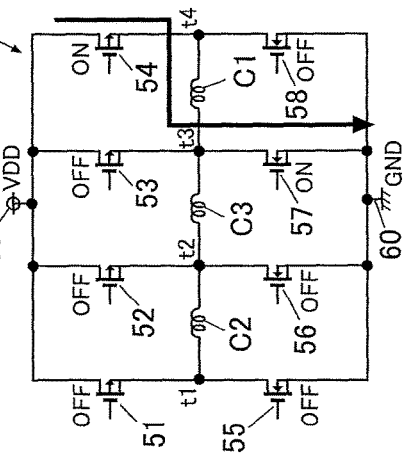
FIG. 10F shows a circuit of a current which flows through the motor drive circuit according to the embodiment of the first embodiment and this circuit corresponds to FIG. 8F.

In the case where the rotor 15 is made to rotate 300 degrees from the initial state, in order to only make the first coil C1 be applied current, the driving pulse generator 651 controls the motor drive circuit 5 by outputting driving pulses to the switching elements 51 to 58 in the first switching unit 653 as needed so as to only make the switching elements 54 and 57 be in the ON state and the other switching elements be in the OFF state. In such way, as shown in FIGS. 8F and 10F, the power voltage Vcc is applied only to the first coil C1, the current paths are blocked in the other coils which are the second coil C2 and the third coil C3 (that is, the second coil C2 and the third coil C3 are virtually cut off from the motor drive circuit 5) and the second coil C2 and the third coil C3 are made to be in the high impedance state.

In such way, by making the other coils be in the high impedance connection state which is different from the normal connection, the power can be saved.

That is, by driving one coil (for example, the first coil C1) while making the coils (for example, the second coil C2 and the third coil C3) other than the coil which is made to be applied current (for example, the first coil C1) be in the high impedance state, the coils which are not driven (for example the second coil C2 and the third coil C3) can be prevented from generating reactance. Thus, the driving can be carried out with a small current and the power can be saved.

Further, in the case where the rotation detection determinator 652 carries out the rotation detection, the rotation detection determinator 652 detects the back electromotive force generated in the coil which is subject to the rotation detection. However, in the stepping motor including a plurality of coils, the back electromotive force generated in the coil which is subject to the rotation detection is dispersed to the plurality of coils including the other coils which are not driven (in the embodiment, the three coils C1, C2 and C3) and absorbed by each other causing reduction in the peak of the back electromotive force making it difficult to carry out an accurate rotation detection. In this aspect, by making the coils other than the coil which is made to be applied current be in the high impedance state, dispersion and absorption of the back electromotive force can be prevented from occurring and the accuracy of the rotation detection carried out by the rotation detection determinator 652 can be improved.

The way of connecting the individual parts in the motor drive circuit 5 and the way to switch the ON/OFF state are not limited to the examples described in the embodiment.

For example, in the case where only the second coil C2 is made to be applied current in the initial state, the driving pulse generator 651 controls the motor drive circuit 5 by outputting the driving pulses to the switching elements 51 to 58 in the first switching unit 653 as needed so as to only make the switching elements 51, 56, 57 and 58 be in the ON state and the other switching elements be in the OFF state as shown in FIG. 11A. In such way, as shown in FIGS. 8A and 11A, the power voltage Vcc is only applied to the second coil C2.

In the case where the rotor 15 is made to rotate 60 degrees from the initial state, in order to only make the third coil C3 be applied current, the driving pulse generator 651 controls the motor drive circuit 5 by outputting driving pulses to the switching elements 51 to 58 in the first switching unit 653 as needed so as to only make the switching elements 53, 54, 55 and 56 be in the ON state and the other switching elements be in the OFF state. In such way, as shown in FIGS. 8B and 11B, the power voltage Vcc is only applied to the third coil C3.

In the case where the rotor 15 is made to rotate 120 degrees from the initial state, in order to only make the first coil C1 be applied current, the driving pulse generator 651 controls the motor drive circuit 5 by outputting driving pulses to the switching elements 51 to 58 in the first switching unit 653 as needed so as to only make the switching elements 51, 52, 53 and 58 be in the ON state and the other switching elements be in the OFF state. In such way, as shown in FIGS. 8C and 11C, the power voltage Vcc is only applied to the first coil C1.

In the case where the rotor 15 is made to rotate 180 degrees from the initial state, in order to only make the second coil C2 be applied current, the driving pulse generator 651 controls the motor drive circuit 5 by outputting driving pulses to the switching elements 51 to 58 in the first switching unit 653 as needed so as to only make the switching elements 52, 53, 54 and 55 be in the ON state and the other switching elements be in the OFF state. In such way, as shown in FIGS. 8D and 11D, the power voltage Vcc is only applied to the second coil C2.

In the case where the rotor 15 is made to rotate 240 degrees from the initial state, in order to only make the third coil C3 be applied current, the driving pulse generator 651 controls the motor drive circuit 5 by outputting driving pulses to the switching elements 51 to 58 in the first switching unit 653 as needed so as to only make the switching elements 51, 52, 57 and 58 be in the ON state and the other switching elements be in the OFF state. In such way, as shown in FIGS. 8E and 11E, the power voltage Vcc is only applied to the third coil C3.

In the case where the rotor 15 is made to rotate 300 degrees from the initial state, in order to only make the first coil C1 be applied current, the driving pulse generator 651 controls the motor drive circuit 5 by outputting driving pulses to the switching elements 51 to 58 in the first switching unit 653 as needed so as to only make the switching elements 54, 55, 56 and 57 be in the ON state and the other switching elements be in the OFF state. In such way, as shown in FIGS. 8F and 11F, the power voltage Vcc is only applied to the first coil C1.

In such way, by changing the way of wiring and the way of switching the ON/OFF state as needed, similarly to the embodiment, driving pulses can also be output to the switching elements 51 to 58 in the first switching unit 653 as needed so that the current for driving the coils C1, C2 and C3 flow through one path in order to sequentially drive the three coils C1, C2 and C3 on coil at a time.

In such way, the energy required to drive the stepping motor 1 can be reduced and the power can be saved.

Second Embodiment

Next, with reference to FIGS. 12A to 12F, FIG. 13 and FIG. 14, the second embodiment of the stepping motor and the motor drive device according to the present invention will be described. In the embodiment, only the way the coils are connected and their operation control are different from the first embodiment. Therefore, in the following description, only the aspects which are different from the first embodiment will be described.

The configuration of when the stepping motor and the motor drive device according to the embodiment are applied to a time display device such as a time piece is the same as that described in the first embodiment. Therefore, the description is omitted.

In the embodiment, the stepping motor 1 includes the three coils C1, C2 and C3 similarly to the first embodiment.

FIGS. 12A to 12F show the magnetic flux which flows through each of the coils C1, C2 and C3 in the case where the rotor 15 of the stepping motor 1 is made to rotate in steps of 60 degrees. The arrows indicate the directions of the magnetic fluxes which flow in the coils C1, C2 and C3.

FIGS. 13A to 13F show the circuit in the motor drive circuit 5 and FIGS. 13A to 13F correspond to the conditions shown in FIGS. 12A to 12F, respectively.

Figure 14:
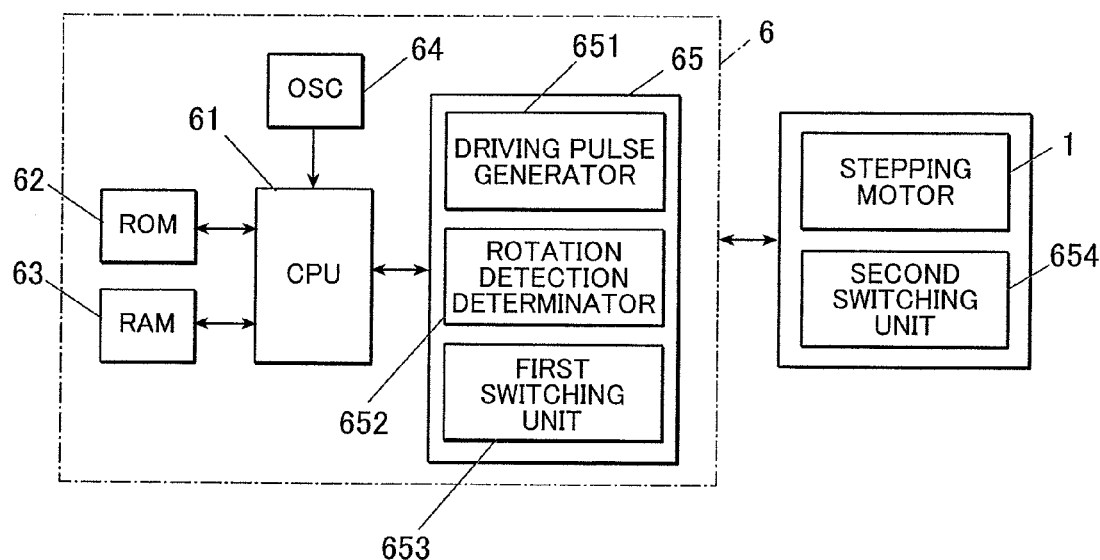
FIG. 14 is a block diagram of main components showing the controlling structure according to the second embodiment.

FIG. 14 is a block diagram of main components showing the controlling structure according to the embodiment.

In the embodiment, as shown in FIGS. 13A to 13F, the three coils C1, C2 and C3 are connected in series.

As shown in FIG. 14, similarly to the first embodiment, in addition to being provided with the first switching unit 653 including the switching elements 51 to 58 which are inner switches provided in the controller 6 which is configured by including a LSI or the like, the stepping motor 1 is provided with the second switching unit 654 including the switching elements 61 to 64 for switching the ON/OFF state between the first coil C1, the second coil C2 and the third coil C3 being connected in series, in the embodiment. The switching elements 61 to 64 are external switches provided on the main substrate 2 or the like.

In such way, since the embodiment includes the switching elements 61 to 64 which are provided as external switches, differently from the first embodiment, the relation between the connecting points t1, t2, t3 and t4 which provide electrical connection, magnetic connection and functional connection and the physical pads on the stepping motor 1 change as needed.

The driving pulse generator 651 generates driving pules for simultaneously driving the three coils C1, C2 and C3 and outputs the driving pulses to the switching elements 51 to 58 (the first switching unit 653 including the switching elements 51 to 58) and the switching elements 61 to 64 (the second switching unit 654 including the switching elements 61 to 64). In such case, similarly to the first embodiment, the driving pulse generator 651 outputs driving pulses as needed to the first switching unit 653 including the switching elements 51 to 58 and the second switching unit 654 including the switching element 61 to 64 so that the current for driving the coils C1, C2 and C3 flow through one path. The first switching unit 653 and the second switching unit 654 switch the ON/OFF state of the switching elements 51 to 58 and the switching elements 61 to 64 as needed in accordance with driving pulses.

Other configurations are the same as those in the first embodiment. Therefore, the same symbols are used for the same components and their description is omitted.

Next, the operation of the stepping motor 1 and the motor drive device according to the embodiment will be described.

Figures 13A, 13B, 13C, 13D, 13E, 13F:
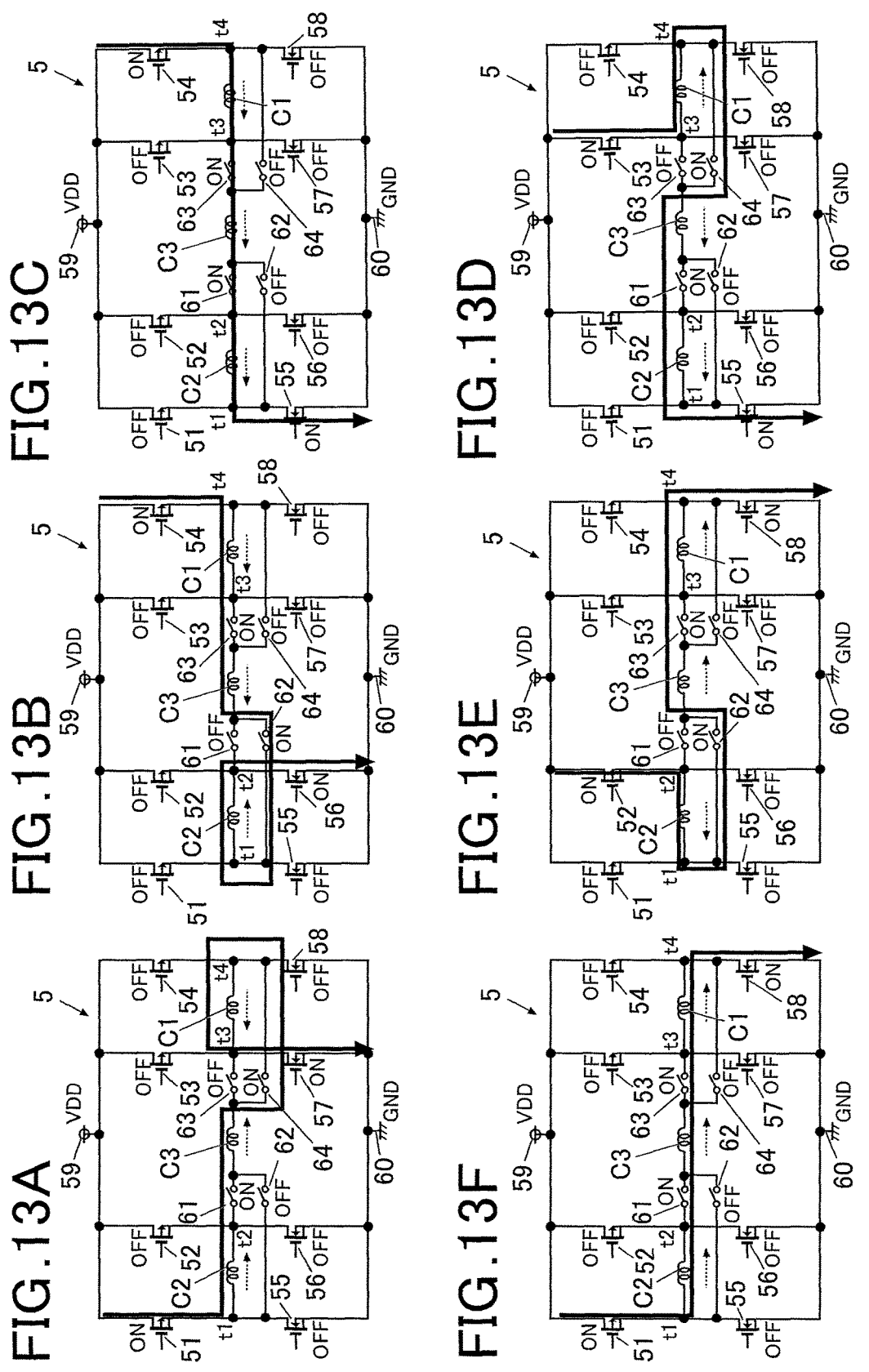

First, in FIG. 12A which shows the initial state, the driving pulse generator 651 controls the first switching unit 653 and the second switching unit 654 so as to make the switching elements 51, 57, 61 and 64 be in the ON state and the other switching elements be in the OFF state as shown in FIG. 13A. In such way, although the current flows through one path in the motor drive circuit 5, all of the three coils C1, C2 and C3 are simultaneously driven and the magnetic fluxes flow in the coils C1, C2 and C3 as shown in FIG. 12A.

In the case where the rotor 15 is made to rotate 60 degrees from the initial state, as shown in FIG. 13B, the driving pulse generator 651 controls the first switching unit 653 and the second switching unit 654 so as to make the switching elements 54, 56, 62 and 63 be in the ON state and to the other switching elements be in the OFF state. In such way, although the current flows through one path in the motor drive circuit 5, all of the three coils C1, C2 and C3 are simultaneously driven and the magnetic fluxes flow in the coils C1, C2 and C3 as shown in FIG. 12B. Then, the three magnetic poles that are generated around the rotor 15 are switched and the rotor 15 rotates 60 degrees from the initial state.

In the case where the rotor 15 is made to rotate 120 degrees from the initial state, as shown in FIG. 13C, the driving pulse generator 651 controls the first switching unit 653 and the second switching unit 654 so as to make the switching elements 54, 55, 61 and 63 be in the ON state and the other switching elements be in the OFF state. In such way, although the current flows through one path in the motor drive circuit 5, all of the three coils C1, C2 and C3 are simultaneously driven and the magnetic fluxes flow in the coils C1, C2 and C3 as shown in FIG. 12C. Then, the three magnetic poles that are generated around the rotor 15 are switched and the rotor 15 rotates 120 degrees from the initial state.

In the case where the rotor 15 is made to rotate 180 degrees from the initial state, as shown in FIG. 13D, the driving pulse generator 651 controls the first switching unit 653 and the second switching unit 654 so as to make the switching elements 53, 55, 61 and 64 be in the ON state and the other switching elements be in the OFF state. In such way, although the current flows through one path in the motor drive circuit 5, all of the three coils C1, C2 and C3 are simultaneously driven and the magnetic fluxes flow in the coils C1, C2 and C3 as shown in FIG. 12D. Then, the three magnetic poles that are generated around the rotor 15 are switched and the rotor 15 rotates 180 degrees from the initial state.

In the case where the rotor 15 is made to rotate 240 degrees from the initial state, as shown in FIG. 13E, the driving pulse generator 651 controls the first switching unit 653 and the second switching unit 654 so as to make the switching elements 52, 58, 62 and 63 be in the ON state and the other switching elements be in the OFF state. In such way, although the current flows through one path in the motor drive circuit 5, all of the three coils C1, C2 and C3 are simultaneously driven and the magnetic fluxes flow in the coils C1, C2 and C3 as shown in FIG. 12E. Then, the three magnetic poles that are generated around the rotor 15 are switched and the rotor 15 rotates 240 degrees from the initial state.

In the case where the rotor 15 is made to rotate 300 degrees from the initial state, as shown in FIG. 13F, the driving pulse generator 651 controls the first switching unit 653 and the second switching unit 654 so as to make the switching elements 51, 58, 61 and 63 be in the ON state and the other switching elements be in the OFF state. In such way, although the current flows through one path in the motor drive circuit 5, all of the three coils C1, C2 and C3 are simultaneously driven and the magnetic fluxes flow in the coils C1, C2 and C3 as shown in FIG. 12F. Then, the three magnetic poles that are generated around the rotor 15 are switched and the rotor 15 rotates 300 degrees from the initial state.

In such way, by simultaneously activating all of the coils C1, C2 and C3 while changing the direction of the current, the power can be saved even more comparing to the case where the coils are driven one coil at a time.

Other aspects are the same as those in the first embodiment. Therefore, the description is omitted.

As described above, the advantages similar to that can be obtained in the first embodiment can also be obtained in the embodiment and further, the following advantages can also be obtained.

That is, in the embodiment, the three coils C1, C2 and C3 of the stepping motor 1 are connected in series and all of the coils C1, C2 and C3 are simultaneously activated.

In such case, the resistance in the coils C1, C2 and C3 is tripled. Therefore, if the driving pulse generator 651 inputs the driving pulses having the same pulse width to the motor drive circuit 5, the current consumption is ⅓ comparing to the case where the coils are driven one coil at a time and the magnetic fluxes which are generated in the coils C1, c2 and C3 themselves will be tripled. Thus, the energy efficiency is greatly improved comparing to the case where the coils are connected in parallel and they are driven one coil at a time.

Therefore, a great output can be obtained with the same current consumption. Moreover, the number of windings in the coils required for obtaining the same output can also be reduced. In such case, the stepping motor 1 can further be downsized.

In the case where the rotation detection determinator 652 carries out the rotation detection, if the three coils C1, C2 and C3 are connected in series as in the embodiment, this leads to increase in the peak of the back electromotive force and the accuracy in the rotation detection is expected to be improved.

Although embodiments of the present invention are described above, the present invention is not limited to the above embodiments and various modifications can be made to the present invention within the scope of the embodiment.

For example, in the above described embodiments, examples where the stator 11 is formed of permalloy C and the first side yoke 12 and the second side yoke 13 are formed of permalloy B whose saturation magnetic flux density is greater than permalloy C are shown. However, any material can be used to form the stator 11, the first side yoke 12 and the second side yoke 13 as long as the material has high magnetic permeability and the material is not limited to the ones mentioned in the embodiments.

For example, all of the stator 11, the side yoke 12 and the second side yoke 13 can be formed of permalloy C or all the them can be formed of permalloy B.

Further, any one of or all of them can be formed of pure iron or the like.

In the case where all of the stator 11, the first side yoke 12 and the second side yoke 13 are to be formed of the same material, there is no need to consider the difference in the saturation magnetic flux density and the like. Therefore, there is no need to make the cross-section area of the straight part 111 of the stator 11 be larger than the cross-section areas of the straight parts 121 and 131 of the first side yoke 12 and the second side yoke 13 and the efficiency in design and manufacturing can be improved.

Further, in the above described embodiments, examples where the stepping motor 1 is configured by magnetically connecting the stator 11 which forms the center yoke and the two side yokes (that is, the first side yoke 12 and the second side yoke 13) are shown. However, the configuration of the stator 11 and the side yokes is not limited to such configuration.

For example, in the case where all of the stator 11 which forms the center yoke of the stepping motor and the two side yokes thereof are formed of the same material as described above, these components can be formed as an integrated component and the three coils C1, C2 and C3 can be formed by winding coils around the straight parts, inserting the coils through between the straight parts.

In such way, if the stator 11 which forms the center yoke and the two side yokes are physically integrated, the connecting parts between the components do not exist. Therefore, loss will not occur in the air layers at the connecting parts and the stepping motor can be driven more efficiently and lower current consumption can be realized and further, the power can be saved.

The first embodiment describes an example where only one coil is driven and the second embodiment describes an example where the three coils are connected in series and they are simultaneously driven. However, the way of driving the coils is not limited to the examples.

For example, in the case where three coils C1, C2 and C3 are provided, any two of the coils may be simultaneously driven (for example, the first coil C1 and the second coil C2).

In such case, two magnetic poles are generated in the stator 11 and the third is a non-polar state, and this causes the direction in which the rotor 15 holds still be shifted by 30 degrees. Therefore, in order to make the rotor 15 stop stably, it is preferable to dispose each of the stator-side stoppers 116 in the position shifted by 30 degrees from the positions shown in FIG. 1A and the like.

The stator-side stoppers 116 in the above embodiments can be any type as long as sufficient index torque (holding torque) for maintaining the still state of the rotor 15 can be obtained and their shapes and the like are not limited to what are shown as examples in the embodiments. Further, stoppers such as concaves may also be formed on the rotor 15 side.

In the above embodiments, the cases where the stepping motor 1 and the motor drive device are used to activate the hand moving mechanism for moving the hands of a time display device such as the time piece 500 and the like are described as examples. However, the stepping motor 1 and the motor drive device are not limited to be used to drive the hand moving mechanism of a time piece.

For example, the stepping motor 1 and the motor drive device may be applied to a time display device which is provided with other hands and the like.

Further, the stepping motor 1 and the motor drive device are not limited to be applied to a time display device. They can be applied as the drive source of various types of devices which are driven by motors which are driven in steps of predetermined degrees.

It is needless to say that the present invention is not limited to the above described embodiments and can be modified as needed.

Although several embodiments of the present invention are described above, the scope of the present invention is not limited to the embodiments and includes what is claimed and the equivalents thereof.

The entire disclosure of Japanese Patent Application No. 2016-061165 filed on Mar. 25, 2016 is incorporated herein by reference in its entirety.

What is claimed is:
1. A stepping motor, comprising:
  a rotor which is two-pole magnetized in a radius direction;
  a stator which is formed of a first member and is provided with a rotor receiving section for receiving the rotor;
  a yoke which comprises a first side yoke and a second side yoke, both of which are formed of members different from each other and from the first member, and which are disposed on both sides of the stator at approximately bisymmetric positions; and
  three coils which are magnetically connected with the stator,
  wherein at least one of the three coils is an integrated coil which is integrally formed with the stator by winding a coil around a part of the stator, and a coil other than the integrated coil among the three coils is formed by winding a coil around a part of the yoke.
2. The stepping motor of claim 1, wherein:
  the stator includes a straight part and a projecting part which projects from one end of the straight part in a direction orthogonal to an extending direction of the straight part;

the integrated coil is formed by winding the coil around the straight part; and other coils of the three coils are magnetically connected with the projecting part of the stator.

3. The stepping motor of claim 2, wherein a part of connecting points with which the threes coils are connected is commonly used.

4. The stepping motor of claim 3, wherein the three coils are connected in series.

5. The stepping motor of claim 2, wherein;

the rotor receiving section is provided with stator-side stoppers along an outer circumference of the rotor, the stator-side stoppers having substantially equal spaces therebetween; and the rotor holds still at a position where any one of the stator-side stoppers and a polar boundary position of the rotor face each other; and the polar boundary position is located on a surface of the rotor at a center between two magnetic poles of the rotor.

6. The stepping motor of claim 5, wherein a part of connecting points with which the threes coils are connected is commonly used.

7. The stepping motor of claim 5, wherein the three coils are connected in series.

8. The stepping motor of claim 2, wherein the three coils are connected in series.

9. The stepping motor of claim 1, wherein:

the rotor receiving section is provided with stator-side stoppers along an outer circumference of the rotor, the stator-side stoppers having substantially equal spaces therebetween;

the rotor holds still at a position where any one of the stator-side stoppers and a polar boundary position of the rotor face each other; and the polar boundary position is located on a surface of the rotor at a center between two magnetic poles of the rotor.

10. The stepping motor of claim 9, wherein a part of connecting points with which the threes coils are connected is commonly used.

11. The stepping motor of claim 10, wherein the three coils are connected in series.

12. The stepping motor of claim 9, wherein the three coils are connected in series.

13. The stepping motor of claim 1, wherein a part of connecting points with which the threes coils are connected is commonly used.

14. The stepping motor of claim 13, wherein the three coils are connected in series.

15. The stepping motor of claim 1, wherein the three coils are connected in series.

16. A time display device comprising the stepping motor of claim 1.

17. The stepping motor of claim 1, wherein the three coils consist of:

the integrated coil which is integrally formed with the stator by winding the coil around the part of the stator;

a first other coil, which is formed by winding a coil around a part of the first side yoke; and a second other coil, which is formed by winding a coil around a part of the second side yoke.

18. The stepping motor of claim 17, wherein terminals of the three coils are connected to four connecting points, and one of the four connecting points is used in common by the three coils.

19. The stepping motor of claim 17, wherein the stator is formed of a different material than the first and second side yokes.

* * * * *

UNITED STATES PATENT AND TRADEMARK OFFICE
CERTIFICATE OF CORRECTION

PATENT NO. : 10,511,248 B2
APPLICATION NO. : 15/391704
DATED : December 17, 2019
INVENTOR(S) : Yuta Saito It is certified that error appears in the above-identified patent and that said Letters Patent is hereby corrected as shown below:

On the Title Page

Column 2, item (56) under "FOREIGN PATENT DOCUMENTS", Line 2, delete "08047726" and insert --08047226--.

Signed and Sealed this
Twenty-third Day of June, 2020

Andrei Iancu
*Director of the United States Patent and Trademark Office*